US000001336H

United States Statutory Invention Registration [19]

[11] Reg. Number: H1336

[43] Published: Jul. 5, 1994

Kuno et al.

[54] SILVER HALIDE PHOTOGRAPHIC MATERIAL

[75] Inventors: Koichi Kuno; Tetsuo Yoshida; Masahiro Okada; Shigeru Ohno, all of Kanagawa, Japan

[73] Assignee: Fuji Photo Film Co., Ltd., Kanagawa, Japan

[21] Appl. No.: 938,584

[22] Filed: Sep. 2, 1992

Related U.S. Application Data

[63] Continuation of Ser. No. 700,338, May 7, 1991, abandoned, which is a continuation of Ser. No. 302,697, Jan. 27, 1989, abandoned.

[30] Foreign Application Priority Data

Jan. 27, 1988 [JP] Japan ..... 63-16255
Jan. 27, 1988 [JP] Japan ..... 63-16257

[51] Int. Cl.[5] ..... G03C 1/06

[52] U.S. Cl. ..... 430/522; 430/513; 430/578

[58] Field of Search ..... 430/513, 522, 578, 585, 430/588

[56] References Cited

U.S. PATENT DOCUMENTS

| | | | |
|---|---|---|---|
| 3,706,570 | 12/1972 | Nakazawa et al. | 430/588 |
| 3,989,528 | 11/1976 | Sugiyama et al. | 430/522 |
| 4,587,195 | 5/1986 | Ishikawa et al. | 430/139 |
| 4,833,246 | 5/1989 | Adachi et al. | 430/522 |
| 4,945,033 | 7/1990 | Deguchi et al. | 430/522 |
| 5,001,043 | 3/1991 | Kawai et al. | 430/522 |
| 5,008,177 | 4/1991 | Goda et al. | 430/522 |

OTHER PUBLICATIONS

Grant & Hackh's Chemical Dictionary, 5th Edition, 1987 p. 560.

*Primary Examiner*—Robert L. Stoll
*Assistant Examiner*—Joseph D. Anthony
*Attorney, Agent, or Firm*—Sughrue, Mion, Zinn, Macpeak and Seas

[57] ABSTRACT

A silver halide photographic material comprising a support having provided thereon a silver halide emulsion layer, in which said silver halide emulsion layer contains at least one sensitizing dye selected from the group consisting of a compound represented by formula (I):

(I)

and a compound represented by formula (II):

(II)

and at least one of said silver halide emulsion layer and other hydrophilic colloidal layers contains a dye represented by formula (III):

(III)

wherein the substituents of the formulas (I), (II) and (III) are as described in the specification. The photographic material exhibits excellent performance properties in terms of sensitivity to light emitted from an (Abstract continued on next page.)

Hc-Ne laser or an LED, safety from safelight, and freedom from color remaining after processing.

15 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC MATERIAL

This is a continuation of application Ser. No. 07/700,338, filed May 7, 1991, now abandoned, which is a dontinuation of application Ser. No. 07/302,697, filed Jan. 27, 1989, now abandoned.

FIELD OF THE INVENTION

This invention relates to a silver halide photographic material. More particularly, it relates to a silver halide photographic material for photomechanical process suitable for exposure using a helium-neon (He-Ne) laser or a light-emitting diode (LED) as a light source.

BACKGROUND OF THE INVENTION

In recent years, scanner systems have been widely employed in the field of photomechanical process. Light sources of the scaner include a glow lamp, a xenon lamp, a tungsten lamp, an LED, an He-Ne laser, an argon laser, and a semi-conductor laser. Among the scanner systems, a dot generator system which directly forms a dot image through electrical signals has been spreading, and an argon laser has conventinally been used as a light source for the scanner of the dot generator system because of its high output, Since an argon laser, however, makes the recording apparatus bulky and expensive, scanners using an He-Ne laser (wavelength: 632.8 nm) as a light source which are more compact and cheaper have recently been developed.

On the other hand, since an LED (wavelength: 660 to 680 nm) is more small-sized and lightweight as compared with other light sources, light-emitting elements thereof can be integrated so that a plurality of lines may be scanned at once to thereby achieve speeding up of the process. Besides, since the light-emitting elements of the LED are solid and can therefore be directly modulated, they are lighted only at the time of recording. Accordingly, the elements have a long life and are of low cost as compared with semi-conductor lasers, etc. From these reasons, scanners using an LED light source are also undergoing developments.

Light-sensitive materials for use in these scanners are required to satisfy various characteristics. That is, they are required to have high spectral sensitivity to the wavelength of the respective light source and to exhibit high sensitivity and high contrast even when exposed at a high intensity of illumination for a short time of from $10^{-3}$ to $10^{-7}$ sec. In the field of facsimile, the light-sensitive materials are required to have resistance to high-temperature and high-speed processing from the standpoint of preferential demand for rapid response and also safety against a bright green safelight from the standpoint of working efficiency.

In order that high sensitivity and high contrast may be assured in the high-intensity and high-speed exposure ($10^{-3}$ to $10^{-7}$ sec) using an He-Ne laser or an LED as a light source, the sensitivity of a silver halide emulsion or the spectral sensitivity of a spectrally sensitized silver halide emulsion should be high on the high-intensity and high-speed exposure. For this purpose, a method for increasing sensitivity of an emulsion by introducing an iridium salt to silver halide is frequently adopted as disclosed in JP-A-48-60918, 58-211753, 61-29837 and 61-201233 ( the term "JP-A" as used herein means an "unexaminee published Japanese patent application) and JP-B-48-42172 (the term "JP-B" as used herein means an "examined published Japanese patent application"). Spectral sensitizing dyes for general purpose of obtaining a red-sensitive emulsion are described in JP-B-43-4933, 48-42172 and 55-39818 and JP-A-50-62425 and 54-18726.

It has been turned out that such a highly sensitive emulsion exhibits high sensitivity and high contrast on actual exposure, but, in turn, frequently shows an increased sensitivity at a low intensity of illumination, resulting in significant reduction of safety from the above-described bright green safelight.

In order to solve this problem, dyes absorbing light in a specific wavelength region are frequently used for coloring a photographic emulsion layer or other layers. Because the layer to be colored, in many cases, comprises a hydrophilic colloid, a water-soluble dye is generally incorporated in the layer. Such a dye should satisfy the following conditions:

1) The dye should have a proper spectral absorption according to the end use.
2) The dye should be photochemically inactive. Namely, it should not give any adverse influences, in a chemical sense, to a silver halide photographic emulsion layer, such as reduction in sensitivity, regression of the latent image, and fog.
3) The dye should be discolored or removed by dissolution during photographic processing, thus leaving no harmful color in the processed photographic material.

Much efforts have been made in the art to discover a dye meeting these requirements.

Of various dyes so far developed, oxonol dyes having two pyrazolone nuclei are discolored in a developer containing a sulfite and have been used as dyes giving reduced adverse influences to a photographic emulsion. For example, oxonol dyes having a sulfoaryl group at the 1-position of the pyrazolone nucleus are described in JP-B-39-22069, 51-46607, 55-10061, 60-53304, and 51-1419; and those having a sulfoalkyl group at the 1-position of the pyrazolone nucleus are described in JP-A-49-99620 and 55-10059. Although the dyes of these types do not seriously affect a photographic emulsion per se, they have been proved disadvantageous for an emulsion having been spectrally sensitized. Namely, they cause spectral sensitization in an undesired region or reduction in sensitivity which is assumably attributed to desorption of a sensitizing dye.

In addition, some of these dyes remain in the photographic material after processing depending on the type of rapid processing which is currently employed. In order to overcome the problem of color remaining, it has been proposed to use a dye highly reactive with a sulfite ion. Such a dye, however, causes reduction of density with time due to insufficient stability in photographic layers, failing to attain desired photographic effects.

On the other hand, dyes having a sulfoaralkyl group at the 1-position of the pyrazolone nucleus and a specific substituent at the 3-position of the pyrazolone nucleus as disclosed in JP-A-50-145125, 50-147712, and 52-20830 are not sufficiently discolored, causing color remaining.

SUMMARY OF THE INVENTION

One object of this invention is to provide a silver halide photographic material which is excellent in safety from safelight and suited for exposure to light emitted from an He-Ne laser or an LED.

Another object of this invention is to provide a silver halide photographic material which is excellent in discoloring properties even when subjected to rapid processing.

A further object of this invention is to provide a silver halide photographic material exhibiting high sensitivity to light of high intensity.

The above objects of this invention can be accomplished by a silver halide photographic material comprising a support having provided thereon a silver halide emulsion layer, in which said silver halide emulsion layer contains at leqst one sensitizing dye selected from the group consisting of compounds represented by formula (I):

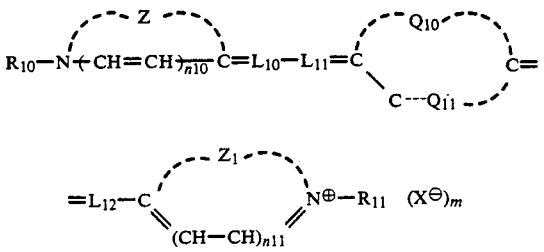

(I)

wherein Z and $Z_1$ each represents a non-metallic atomic group necessary to complete a 5- or 6-membered nitrogen-containing heterocyclic ring; $R_{10}$ and $R_{11}$ each represents a substituted or unsubstituted alkyl group, or an aryl group; $Q_{10}$ and $Q_{11}$ are taken together to represent a non-metallic atomic group necessary to complete a 4-thiazolildinone, 5-thiazolidinone or 4-imidazolidinone nucleus; $L_{10}$, $L_{11}$, and $L_{12}$ each represents a substituted or unsubstituted methine group; $n_{10}$ and $n_{11}$ each represents 0 or 1; X represents an anion; m represents 0 or 1; and when m is 0, the compound has a structure of an intramolecular salt, and compounds represented by formula (II):

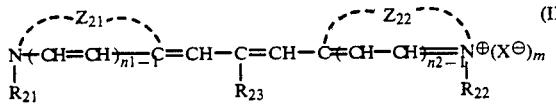

(II)

wherein $Z_{21}$ and $Z_{22}$ each represents a non-metallic atomic group necessary to complete a heterocyclic ring such as a benzothiazole ring, a benzoselenazole ring, a nephthothiazole ring, a naphthoselenazole ring, and a quinoline ring, each of which may be substituted with a lower alkyl group, an alkoxy group, a hydroxyl group, an aryl group, an alkoxycarbonyl group, or a halogen atom; $R_{21}$ and $R_{22}$ each represetns a lower alkyl group, or an alkyl group having a sulfo or carboxyl group; $R_{23}$ represents a lower alkyl group; X represents an anion; n1 and n2 each represents 1 or 2; m represents 1 or 0; and when m is 0, the compound has a structure of an intramolecular salt, and at least one of said silver halide emulsion layer and other hydrophilic colloidal layers contains a dye represented by formula (III):

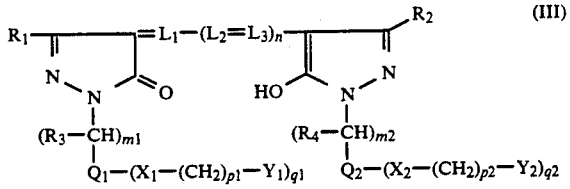

(III)

wherein $R_1$ and $R_2$ each represents a substituted or unsubstituted alkyl group, a substituted or unsubstituted aryl group, a cyano group, $—COOR_5$, $—CONR_5R_6$, $—COR_7$, $—SO_2R_7$, $—SOR_7$, $—SO_2NR_5R_6$, $—OR_5$, $—NR_5R_6$, $—NR_6COR_7$, $—NR_5CONR_5R_6$, or $—NR_6SO_2R_7$, wherein $R_5$ and $R_6$ each represents a hydrogen atom, a substituted or unsubstituted alkyl group; or a substituted or unsubstituted aryl group; $R_7$ represents an alkyl group or an aryl group; or $R_5$ and $R_6$, or $R_6$ and $R_7$ are taken together to form a 5- or 6-membered ring; $R_3$ and $R_4$ each represents a hydrogen atom or an alkyl group; $Q_1$ and $Q_2$ each represents a substituted or unsubstituted aryl group; $X_1$ and $X_2$ each represents a mere bond or a divalent linking group; $Y_1$ and $Y_2$ each represents a sulfo group or a carboxyl group; $L_1$, $L_2$, and $L_3$ each represents a substituted or unsubstituted methine group; n represents 0, 1 or 2; m1 and m2 each represents 1 or 2; p1 and p2 each represetns 0, 1, 2, 3, or 4; and q1 and q2 each represents 1, 2, or 3.

DETAILED DESCRIPTION OF THE INVENTION

In formula (I), the nitrogen-containing heterocyclic ring completed by Z or $Z_1$ includes a thiazole nucleus (e.g., thiazole, 4-methylthiazole, 4-phenylthiazole, 4,5-dimethylthiazole, 4,5-diphenylthiazole), a benzothiazole nucleus (e.g., benzothiazole, 5-chlorobenzothiazole, 6-chlorobenzothiazole, 5-methylbenzothiazole, 6-methylbenzothiazole, 5-bromobenzothiazole, 6-bromobenzothiazole, 5-iodobenzothiazole, 6-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-hydroxybenzothiazole, 5-carboxybenzothiazole, 5-fluorobenzothiazole, 5-dimethylaminobenzothiazole, 5-acetylaminobenzothiazole, 5-trifluoromethylbenzothiazole, 5,6-dimethylbenzothiazole, 5-hydroxy-6-methylbenzothiazole, 5-ethoxy-6-methylbenzothiazole, tetrahydrobenzothiazole), a naphthothiazole nucleus (e.g., naphtho[2,1-d]thiazole, naphtho[1,2-d]thiazole, naphtho-[2,3-d]thiazole, 5-methoxynaphtho[1,2-d]thiazole, 7-ethoxynaphtho[2,1-d]thiazole, 8-methoxynaphtho[2,1-d]-thiazole, 5-methoxynaphtho[2,3-d]thiazole), a selenazole nucleus (e.g., 4-methylselenazole, 4-phenylselenazole), a benzoselenazole nucleus (e.g., benzoselenazole, 5-chlorobenzoselenazole, 5-phenylbenzoselenazole, 5-methoxybenzoselenazole, 5-methylbenzoselenazole, 5-hydroxybenzoselenazole), a napthoselenazole nucleus (e.g., naphtho[2,1-d]selenazole, naphtho[1,2-d]selenazole), an oxazole nucleus (e.g., oxazole, 4-methyloxazole, 5-methyloxazole, 4,5-dimethyloxazole), a benzoxazole nucleus (e.g., benzoxazole, 5-fluorobenzoxazole, 5-chlorobenzoxazole, 5-bromobenzoxazole, 5-trifluoromethylbenzoxazole, 5-methylbenzoxazole, 5-methyl-6-phenylbenzoxazole, 5,6-dimethylbenzoxazole, 5-methoxybenzoxazole, 5,6-dimethoxybenzoxazole, 5-phenylbenzoxazole, 5-carboxybenzoxazole, 5-methoxycarbonylbenzoxazole, 5-acetylbenzoxazole, 5-hydroxybenzoxazole), a naphthoxazole nucleus (e.g., naphtho[2,1-d]oxazole, naphtho[1,2-d]oxazole, naphtho[2,3-d]oxazole), a 2-quinoline nucleus, an imidazole nucleus, a benzimidazole nucleus, a 3,3'-dialkylindolenine nucleus, a 2-pyridine nucleus, and a thiazoline nucleus. It is preferable that at least one of Z and $Z_1$ forms a thiazole, thiazoline, oxazole or benzoxazole nucleus.

$R_{10}$ and $R_{11}$ each represents an alkyl group having 5 or less carbon atoms (e.g., methyl, ethyl, n-propyl, n-butyl); a substituted alkyl group having 5 or less carbon atoms in the alkyl moiety thereof, such as a hydroxyalkyl group (e.g., 2-hydroxyethyl, 3-hydroxypropyl, 4-hydroxybutyl), a carboxyalkyl group [e.g., carboxymethyl, 2-carboxyethyl, 3-carboxypropyl, 4-carboxybutyl, 2-(2-carboxyethoxy)ethyl], a sulfoalkyl group [e.g., 2-sulfoethyl, 3-sulfopropyl, 3-sulfobutyl, 4-sulfobutyl, 2-hydroxy-3-sulfopropyl, 2-(3-sulfopropoxy)ethyl, 2-acetoxy-3-sulfopropyl, 3-methoxy-2-(3-sulfopropoxy)-propyl, 2-[3-sulfopropoxy)ethoxy]ethyl, 2-hydroxy-3-(3'-sulfopropoxy) propyl], an aralkyl group (preferably having a phenyl group as an aryl moiety) (e.g., benzyl, phenethyl, phenylpropyl, phenylbutyl, p-tolylpropyl, p-methoxyphenethyl, p-chlorophenethyl, p-carboxybenzyl, psulfophenethyl, p-sulfobenzyl), an aryloxayalkyl group (preferably having a phenyl group as an aryl moiety) (e.g., phenoxyethyl, phenoxypropyl, phenoxybutyl, p-methylphenoxyethyl, p-methoxyphenoxypropyl), and a vinylmethyl group; or an aryl group (e.g., phenyl).

$L_{10}$, $L_{11}$, and $L_{12}$ each represents a methine group or a substituted methine group of formula

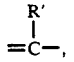

wherein R' represents an alkyl group (e.g., methyl, ethyl), a substituted alkyl group [e.g., an alkoxyalkyl group (e.g., 2-ethoxyethyl), a carboxyalkyl group (e.g., 2-carboxyethyl), an alkoxycarbonylalkyl (e.g., 2-methoxycarbonylethyl), an aralkyl group (e.g., benzyl, phenethyl)], or an aryl group (e.g., phenyl, p-methoxyphenyl, p-chlorophenyl, o-carboxyphenyl). $L_{10}$ and $R_{10}$, or $L_{12}$ and $R_{11}$ may be connected via a methine chain to form a nitrogen-containing heterocyclic ring.

A substituent at the 3-nitrogen atom of the thiazolinone or imidazolinone nucleus formed by $Q_{10}$ and $Q_{11}$ includes an alkyl group, preferably having from 1 to 8 carbon atoms (e.g., methyl, ethyl, propyl), an allyl group, an aralkyl group, preferably having from 1 to 5 carbon atoms in the alkyl moiety thereof (e.g., benzyl, p-carboxyphenylmethyl), an aryl group, preferably having from 6 to 9 carbon atoms in total (e.g., phenyl, p-carboxyphenyl) a hydroxyalkyl group, preferably having from 1 to 5 carbon atoms in the alkyl moiety thereof (e.g., 2-hydroxyethyl), a carboxyalkyl group, preferably having from 1 to 5 carbon atoms in the alkyl moiety thereof (e.g., carboxymethyl), and an alkoxycarbonylalkyl group, preferably having from 1 to 3 carbon atoms in the alkoxy moiety and from 1 to 5 carbon atoms in the alkyl moiety thereof (e.g., methoxycarbonylethyl).

The anion as represented by X includes a halide ion (e.g., iodide ion, bromide ion, chloride ion), a perchlorate ion, a thiocyanide ion, a benzenesulfonate ion, a p-toluenesulfonate ion, a methylsulfate ion, and an ethylsulfate ion.

Of the sensitizing dyes represented by formula (I), preferred are those represented by formula (I-A):

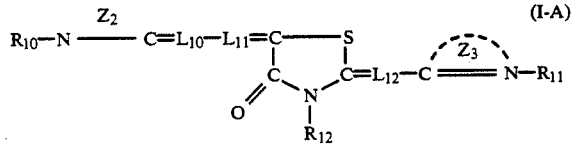

(I-A)

wherein $Z_2$ and $Z_3$, which may be the same or different, each represents a non-metallic atomic group necessary to complete a thiazole, benzothiazole or benzoxazole nucleus; $R_{12}$ represents an alkyl group having from 1 to 6 carbon atoms (e.g., methyl, ethyl, propyl), an allyl group, or an aralkyl group, preferably having from 1 to 5 carbon atoms in the alkyl moiety thereof (e.g., benzyl, p-carboxyphenylmethyl); and $R_{10}$, $R_{11}$, $L_{10}$, $L_{11}$, and $L_{12}$ are as defined above.

Specific examples of the compounds represented by formula (I) are shown below for illustrative purposes only but not for limitaiton.

I-1

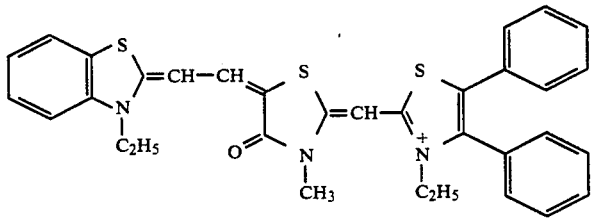

I⁻

I-2

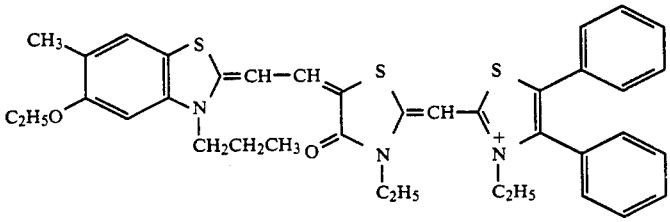

I⁻

-continued
I-3
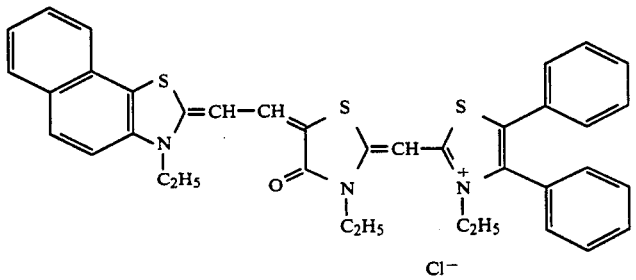
I-4
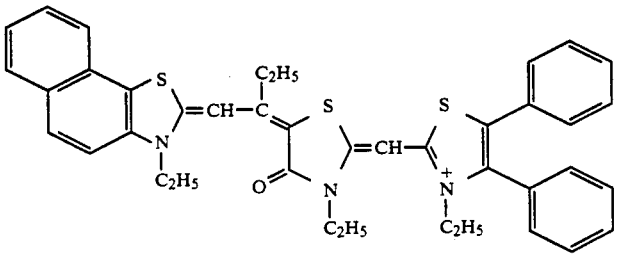
I-5
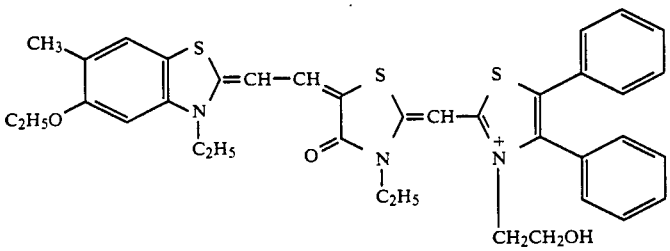
I-6
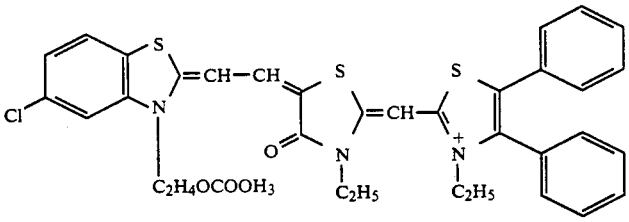
I-7
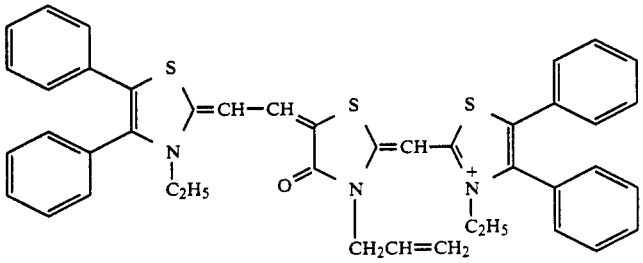

-continued
I-8
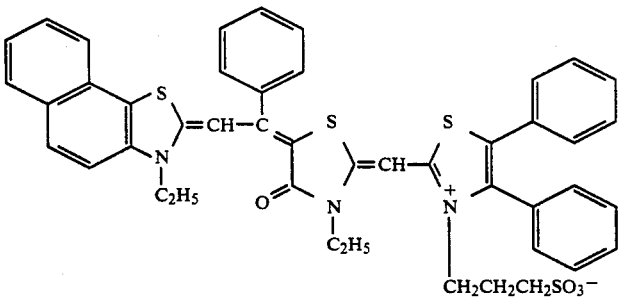
I-9
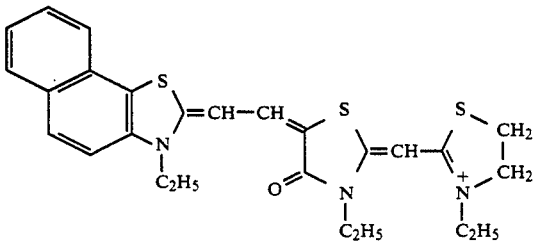
$I^-$
I-10
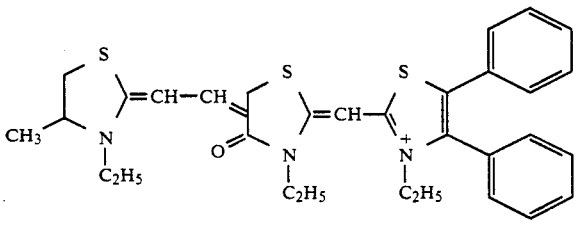
$I^-$
I-11
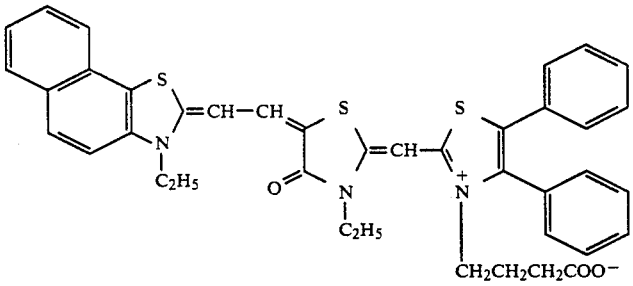
I-12
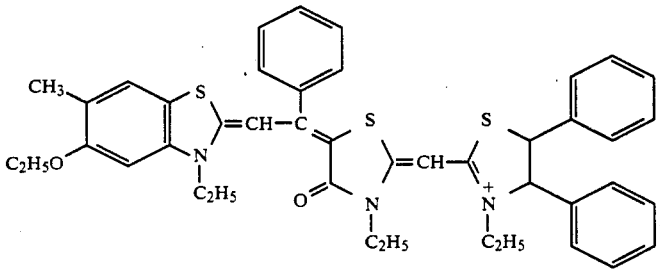
$I^-$ -continued
I-13
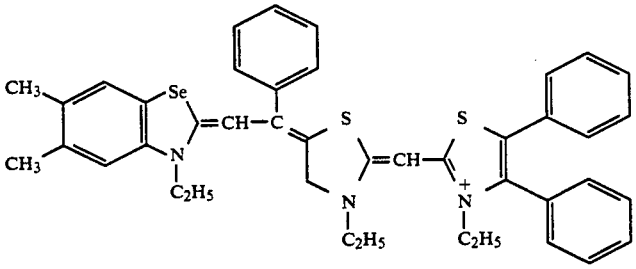
I⁻
I-14
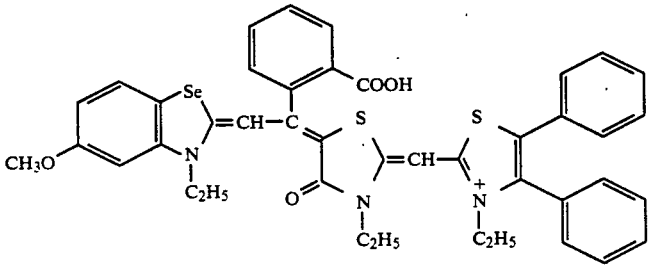
Br⁻
I-15
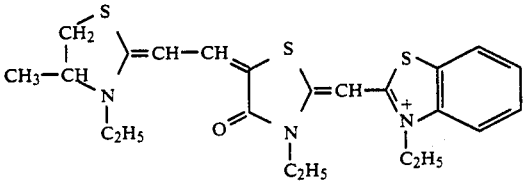
I⁻
I-16
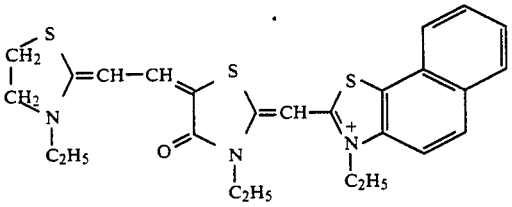
I⁻
I-17
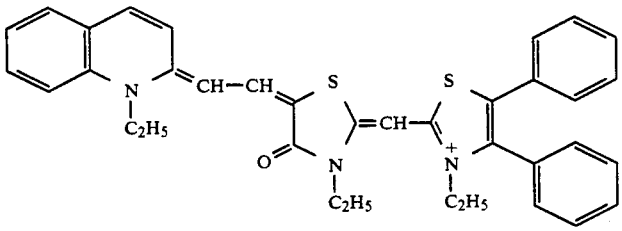
I⁻
I-18
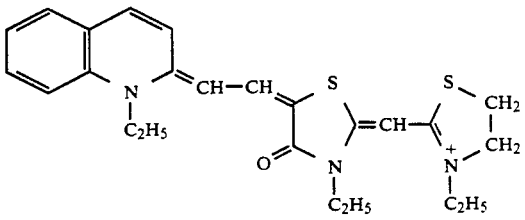
I⁻

-continued
I-19
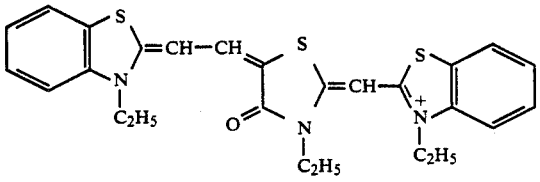
I-20
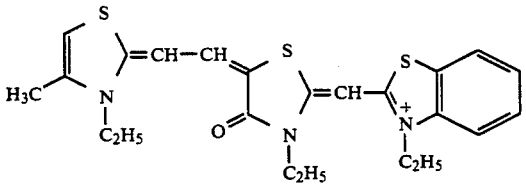
I-21
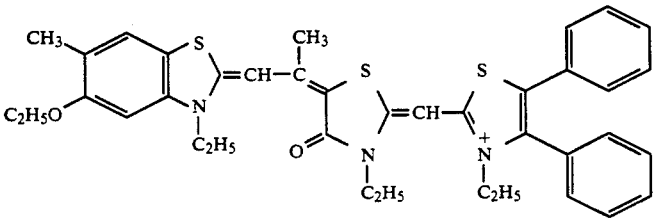
I-22
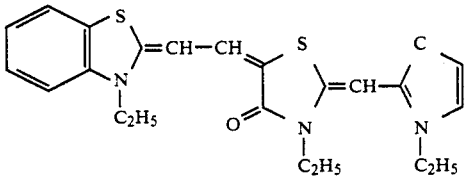
I-23
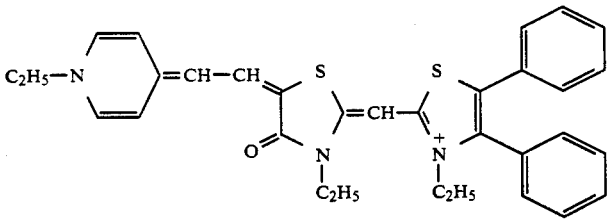
I-24
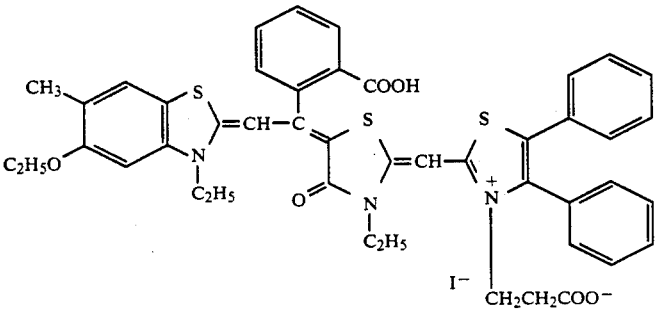

-continued
I-25
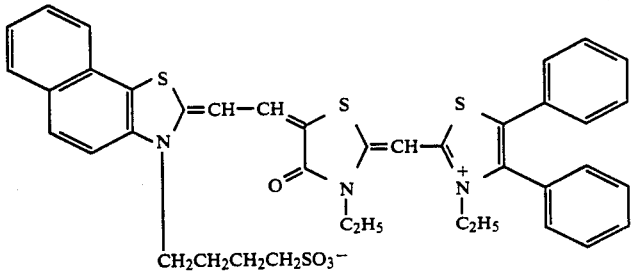
I-26
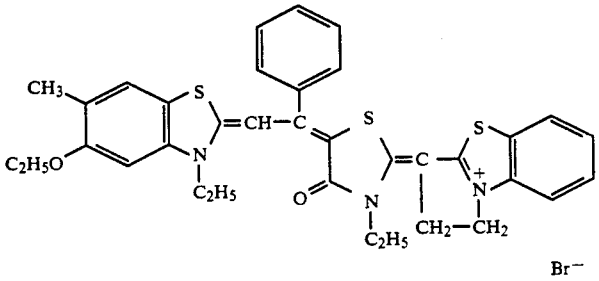
I-27
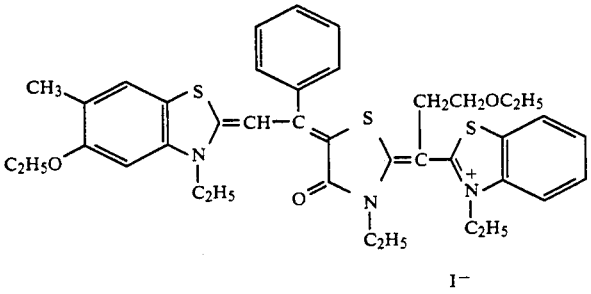
I-28
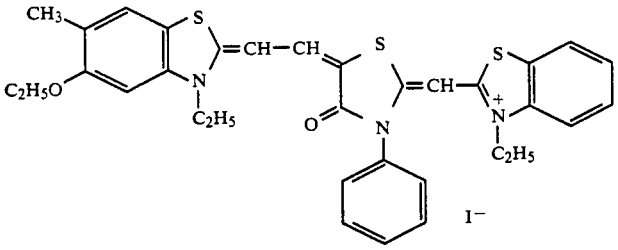
I-29
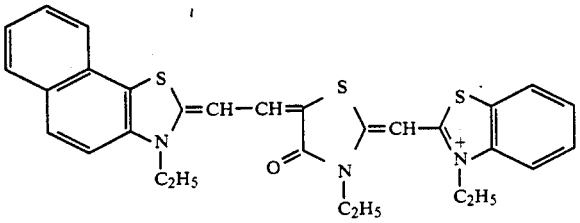

-continued
I-30
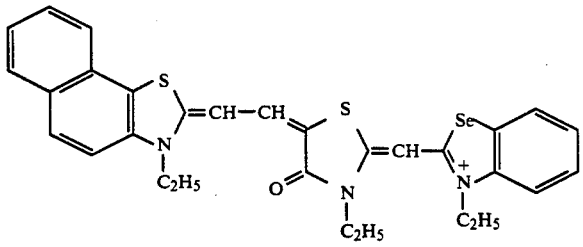
I⁻
I-31
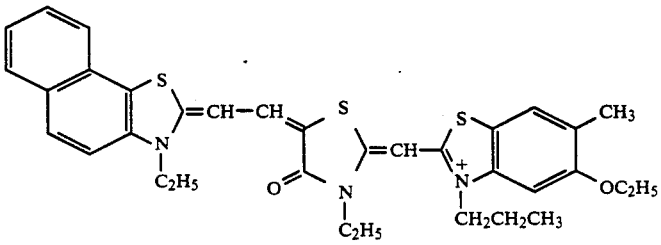
I⁻
I-32
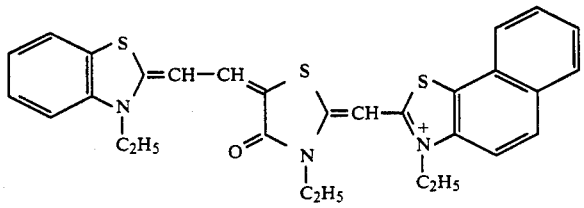
I⁻
I-33
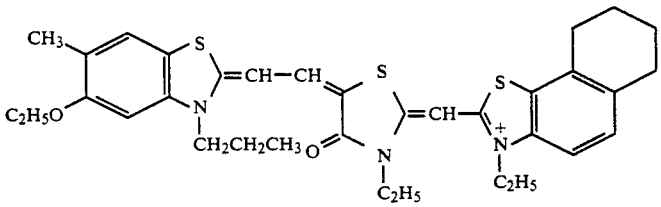
I⁻
I-34
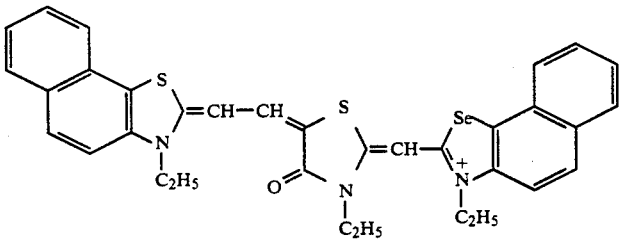
I⁻
I-35
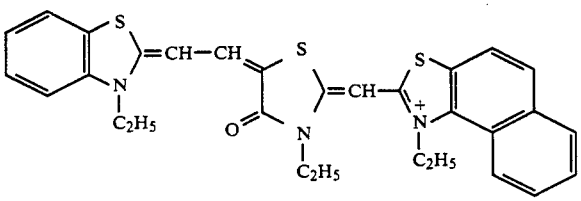
I⁻

-continued

I-36

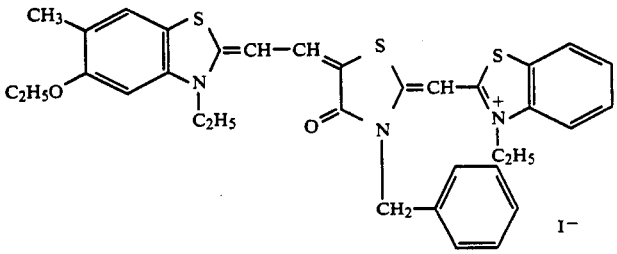

I-37

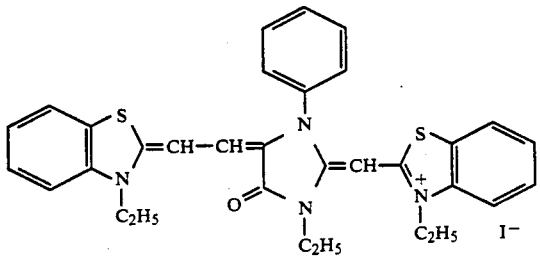

I-38

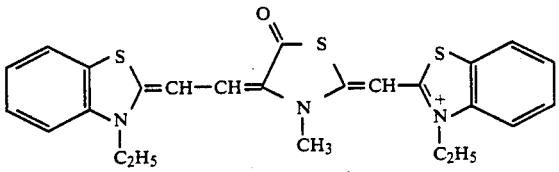

In formula (II), $Z_{21}$ and $Z_{22}$ each represents a non-metallic atomic group necessary to form a benzothiazole, benzoselenazole, naphthothiazole, naphthoselenazole or quinoline ring, each of which may be substituted with a lower alkyl group (e.g., methyl, ethyl), an alkoxyl group (e.g., methoxy, ethoxy), a hydroxyl group, an aryl group (e.g., phenyl), an alkoxycarbonyl group (e.g., methoxycarbonyl), a halogen atom (e.g., chlorine, bromine), etc.

$R_{21}$ and $R_{22}$ each represents a lower alkyl group (e.g., methyl, ethyl, propyl, butyl); an alkyl group having a sulfo group, such as a sulfoalkyl group (e.g., β-sulfoethyl, γ-sulfopropyl, γ-sulfobutyl, γ-sulfobutyl), and a sulfoalkoxyalkyl group (e.g., sulfoethoxyethyl, sulfopropoxyethyl); or an alkyl group having a carboxyl group (e.g., β-carboxyethyl, γ-carboxypropyl, γ-carboxybutyl, γ-carboxybutyl). The sulfo group of an alkyl group of $R_{21}$ or $R_{22}$ can be in the form of a salt.

$R_{23}$ represents a lower alkyl group (e.g., methyl, ethyl, propyl).

X represents an anion commonly used in cyanine dyes (e.g., halide ion, benzenesulfonate ion, p-toluenesulfonate ion).

Specific examples of the compounds represented by formula (II) are shown below for illustrative purposes only but not for limitation.

II-1

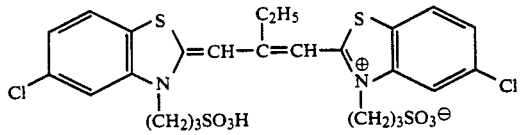

II-2

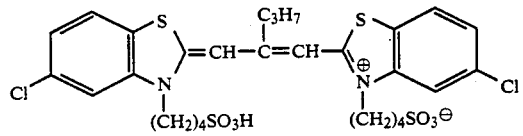

II-3

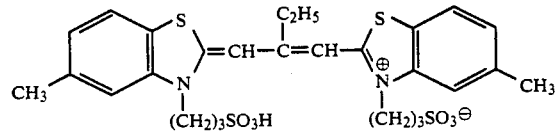

-continued
II-4
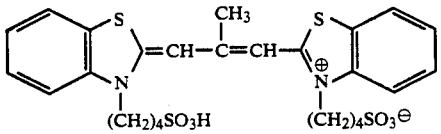
II-5
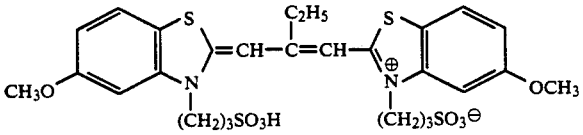
II-6
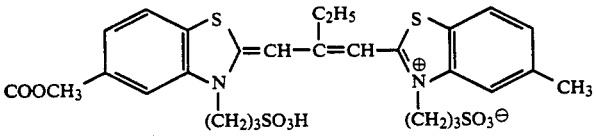
II-7
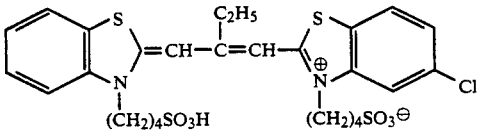
II-8
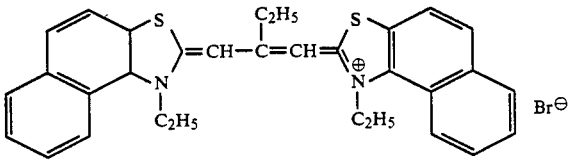
II-9
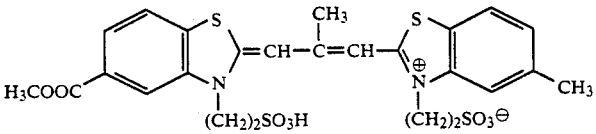
II-10
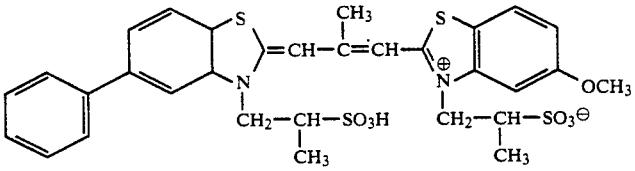
II-11
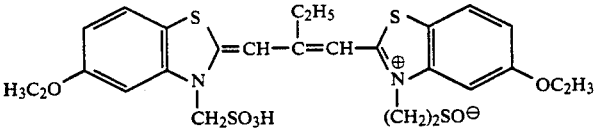
II-12
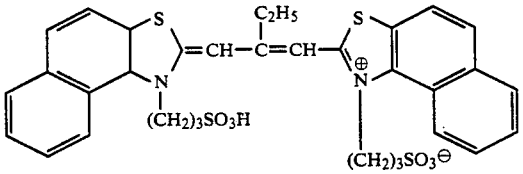
II-13
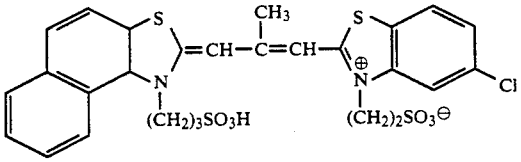

-continued
II-14
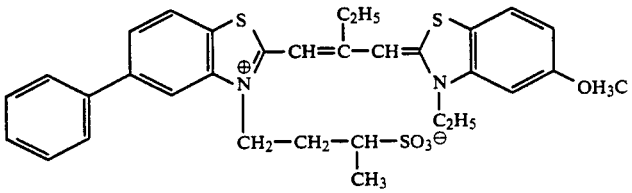
II-15
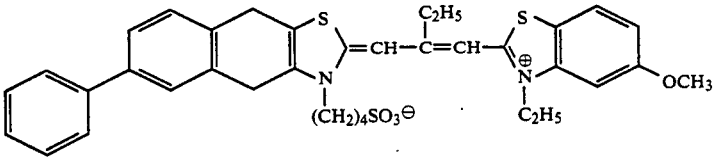
II-16
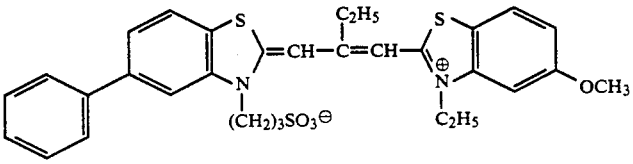
II-17
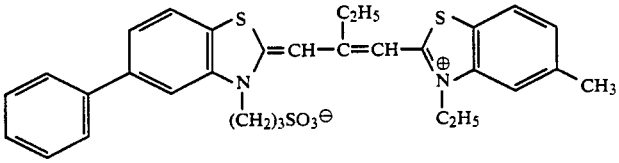
II-18
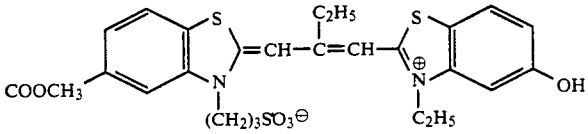
II-19
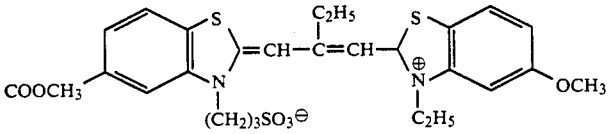
II-20
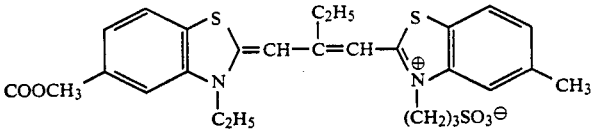
II-21
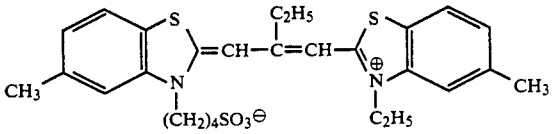
II-22
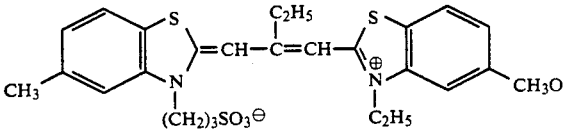
II-23
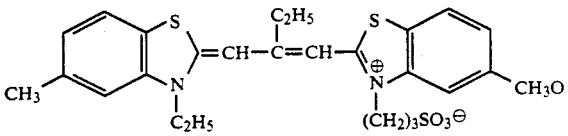

-continued
II-24
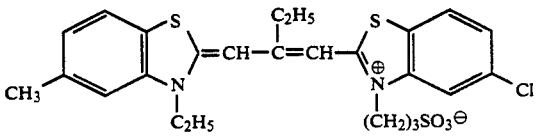
II-25
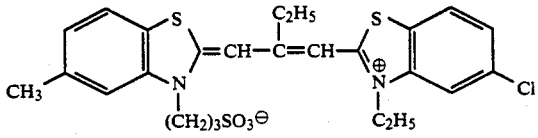
II-26
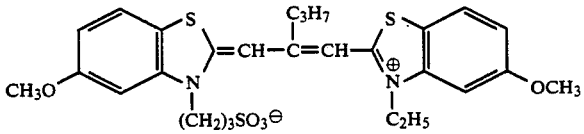
II-27
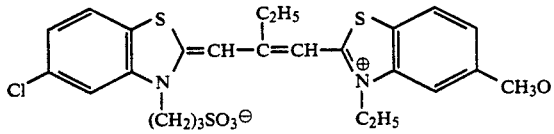
II-28
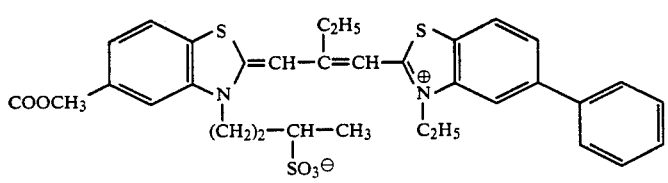
II-29
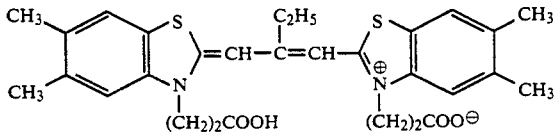
II-30
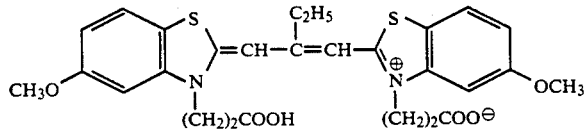
II-31
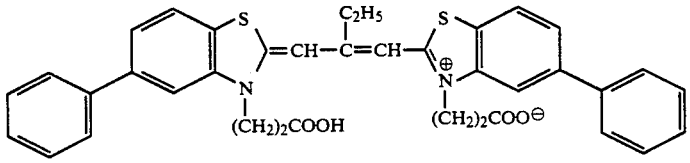
II-32
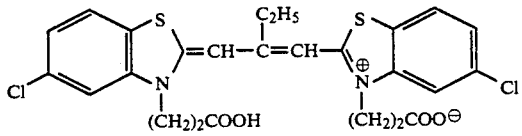
II-33
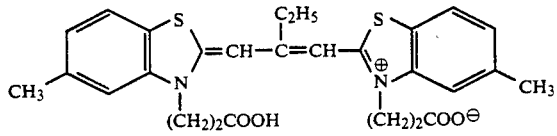

-continued

II-34

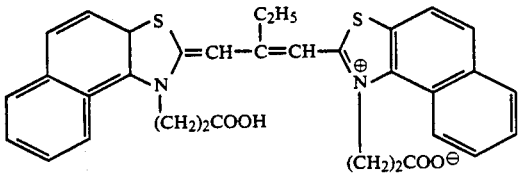

II-35

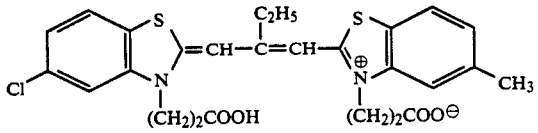

II-36

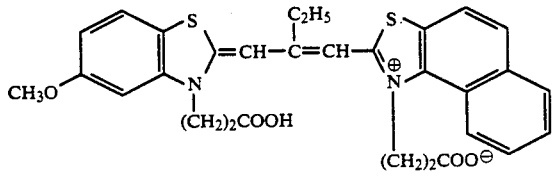

II-37

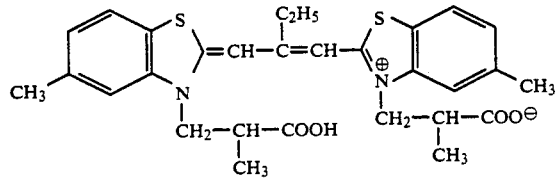

The amount of the sensitizing dyes of formulae (I) and (II) to be added to a silver halide emulsion is appropriately selected from a broad range usually ranging from about 5 mg to 500 mg per mol of silver halide so as to attain desired effects, though varying depending on the kind of silver halide and the kind of the compound added.

The sensitizing dyes of the present invention may be used either individually or in combination thereof as is often used for the purpose of supersensitization. They may be used for supersensitization according to the technique taught, e.g., in JP-B-43-4933. In addition to the sensitizing dyes of the present invention, the emulsion may further contain a substance which shows per se no spectral sensitizing activity or absorbs substantially no visible light but has a supersensitizing activity.

In formula (III), the alkyl group as represented by $R_1$, $R_2$, $R_5$, $R_6$, and $R_7$ preferably contains up to 8 carbon atoms, including methyl, ethyl, n-propyl, isopropyl, n-butyl, isobutyl, t-butyl, n-amyl, n-hexyl, n-octyl, and isoamyl groups. These alkyl groups may be substituted with a halogen atom (e.g., flurorine, chlorine, bromine), a phenyl group, a hydroxyl group, a cyano group, an alkoxy group (e.g., methoxy, ethoxy, hydroxyethoxy), an aryloxy group (e.g., phenoxy, p-methoxyphenoxy), a carboxyl group, a sulfo group, an amino group, a substituted amino group (e.g., dimethylamino, diethylamino), etc.

The alkyl group as represented by $R_3$ or $R_4$ preferably contains up to 4 carbon atoms, including methyl, ethyl, and n-propyl groups.

The aryl group as represented by $R_1$, $R_2$, $R_5$, $R_6$, or $R_7$ preferably includes a phenyl group and a naphthyl group, each of which may be substituted with a halogen atom (e.g., fluorine, chlorine, bromine), a sulfo group, a carboxyl group, a hydroxyl group, a cyano group, an alkyl group having from 1 to 4 carbon atoms (e.g., methyl, ethyl, n-propyl), an alkoxy group (e.g., methoxy, ethoxy), an aryloxy group (e.g., phenoxy), etc.

The aryl group as represented by $Q_1$ or $Q_2$ preferably includes a phenyl group and a naphthyl group, each of which may be substituted with a substituents other than a sulfo group and a carboxyl group, such as an alkyl group having from 1 to 4 carbon atoms (e.g., methyl, ethyl), an alkoxy group (e.g., methoxy, ethoxy), a halogen atom (e.g., fluorine, chlorine, bromine), a carbamoyl group (e.g., methylcarbamoyl, ethylcarbamoyl), a sulfamoyl group (e.g., ethylsulfamoyl), a cyano group, a nitro group, an alkylsulfonyl group (e.g., methanesulfonyl), an arylsulfonyl group (e.g., benzenesulfonyl), an amino group (e.g., dimethylamino, diethylamino), an acylamino group (e.g., acetylamino), a sulfonamido group (e.g., methanesulfonamido), and a hydroxyl group.

The divalent linking group as represented by $X_1$ or $X_2$ includes —O—, —$NR_8$, —$NR_8CO$—, —$SO_2$—, and —$NR_8SO_2$—, wherein $R_8$ represents a hydrogen atom, an alkyl group having up to 5 carbon atoms (e.g., methyl, ethyl, n-propyl, n-butyl, n-amyl, isobutyl), or an alkyl group having up to 5 carbon atoms substituted with an alkoxy group having up to 3 carbon atoms (e.g., methoxy, ethoxy), a sulfo group, a carboxyl group, a cyano group, a hydroxyl group, an amino group (e.g., dimethylamino, diethylamino), a carbamoyl group (e.g., hydroxyethylaminocarbonyl, ethylaminocarbonyl), or a sulfamoyl group (e.g., ethylaminosulfonyl).

The 5- or 6-membered ring formed by a combination of $R_5$ and $R_6$ or a combination of $R_6$ and $R_7$ includes piperidine, morpholine, pyrrolidine, and pyrrolidone rings.

The methine group as represented by $L_1$, $L_2$, or $L_3$ may have a substituent, e.g., methyl, ethyl, cyano, phenyl, chlorine, and sulfoethyl.

In formula (III), the sulfo group, carboxyl group and/or enol moiety may be either in a free form or in the form of a salt, e.g., an Na salt, a K salt, a $(C_2H_5)_3NH$ salt, a pyridinium salt, and an ammonium salt.

Of the compounds represented by formula (III), preferred are those wherein $R_3$ and $R_4$ each represents a hydrogen atom or a methyl group; $Q_1$ and $Q_2$ each represents a phenyl group or a phenyl group substituted with an alkyl group having up to 4 carbon atoms, an alkoxy group up to 4 carbon atoms, a halogen atom (e.g., fluorine, chlorine, bromine), a dialkylamino group having up to 6 carbon atoms, or a hydroxyl group; and $X_1$ and $X_2$ each represents a mere bond, —O—, or —$NR_8$—, wherein $R_8$ is as defined above. More preferred are those wherein m1 and m2 both represent 1, and the most preferred are those wherein m1 and m2 both represent 1; and $R_1$ and $R_2$ each represents an alkyl group, an aryl group, a cyano group, —$COOR_5$, —$CONR_5R_6$, —$COR_7$, —$SO_2R_7$, —$SO_2NR_5R_6$, or —$NR_6SO_2R_7$, wherein $R_5$, $R_6$, and $R_7$ are as defined above.

Specific examples of the compounds represented by formula (III) are shown below for illustrative purposes only but not for limitation.

III-1

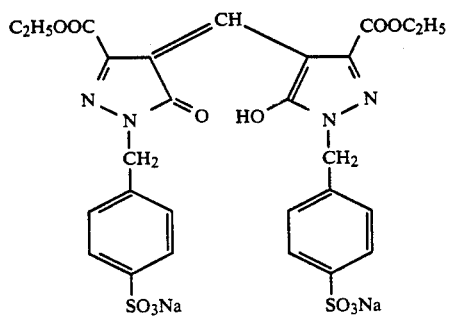

III-2

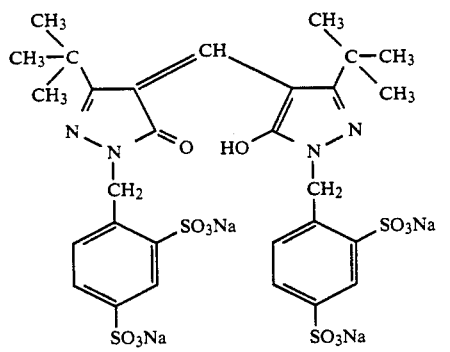

III-3

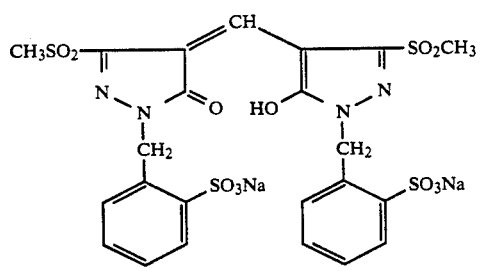

III-4

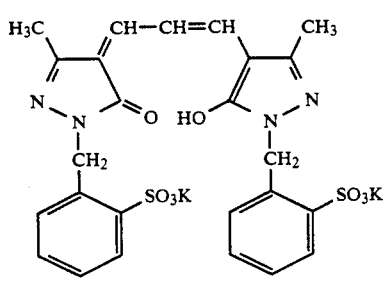

-continued
III-5
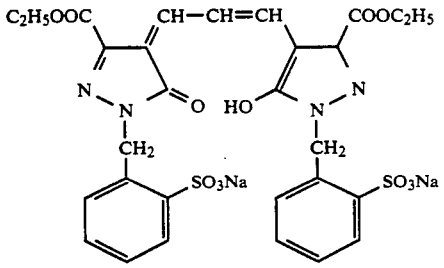
III-6
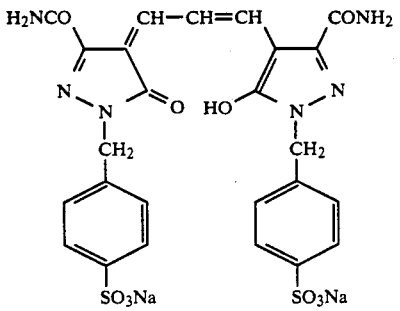
III-7
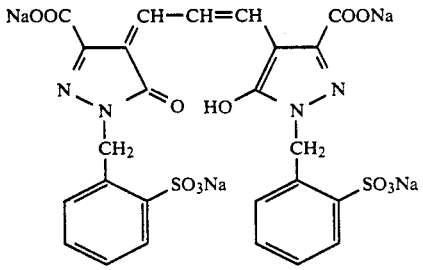
III-8
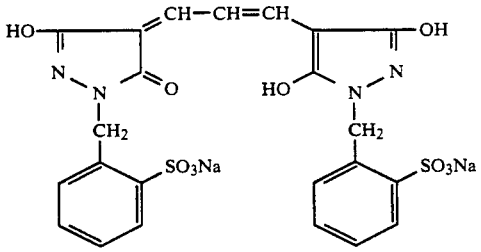
III-9
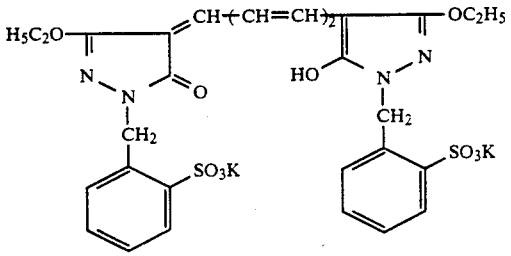

-continued
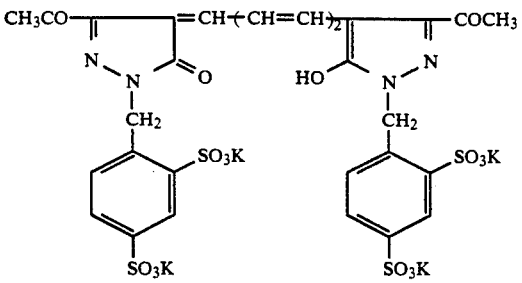
III-10
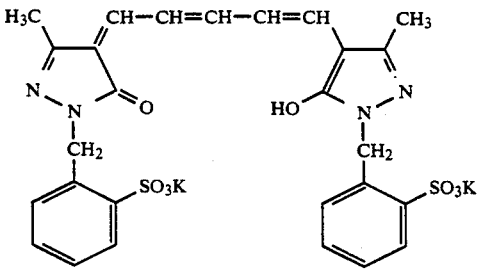
III-11
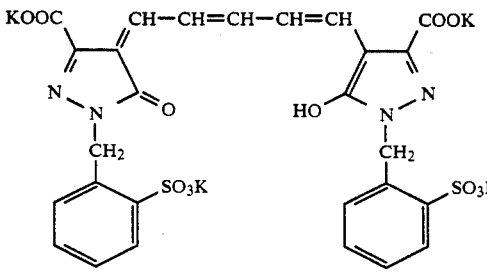
III-12
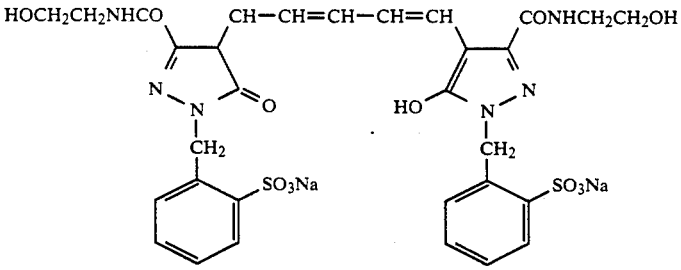
III-13
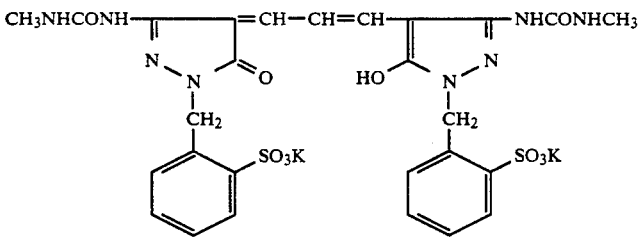
III-14
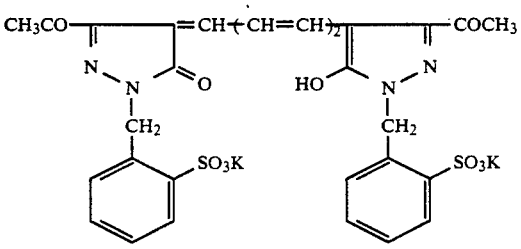
III-15

-continued
III-16
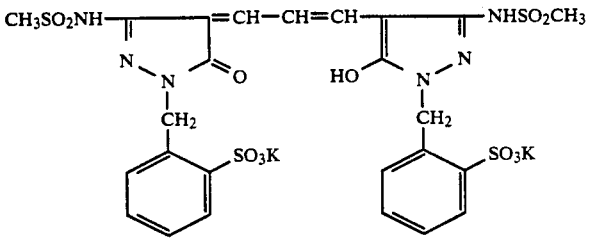
III-17
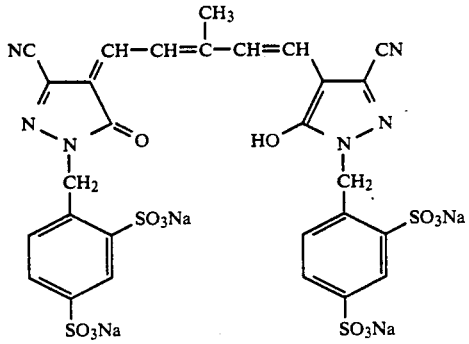
III-18
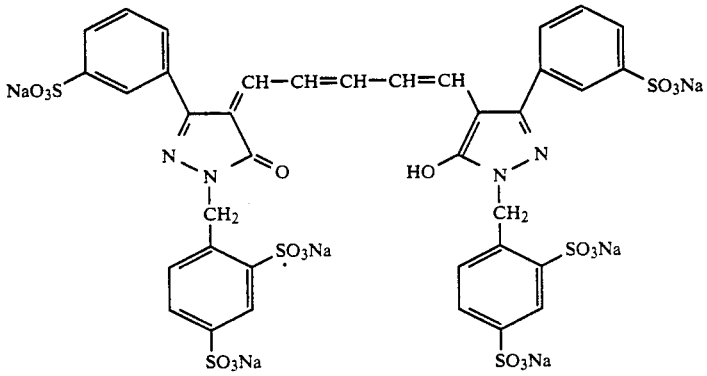
III-19
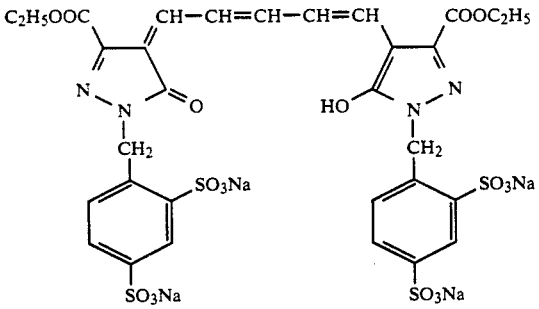
III-20
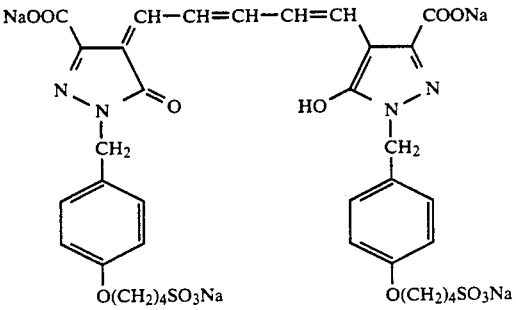

-continued
III-21
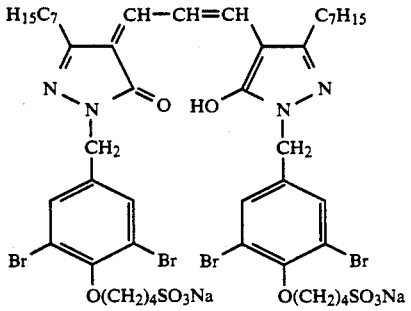
III-22
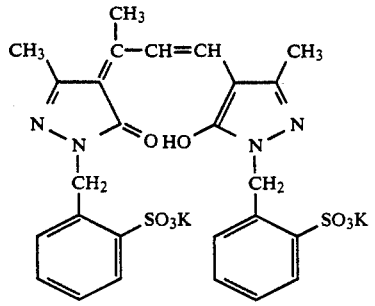
III-23
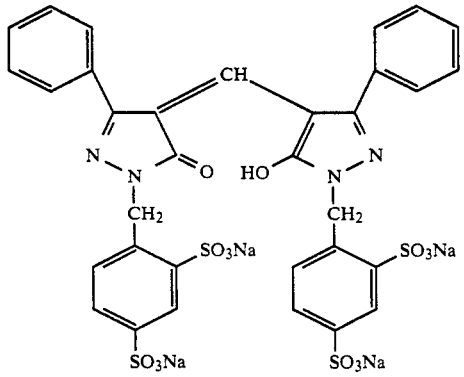
III-24
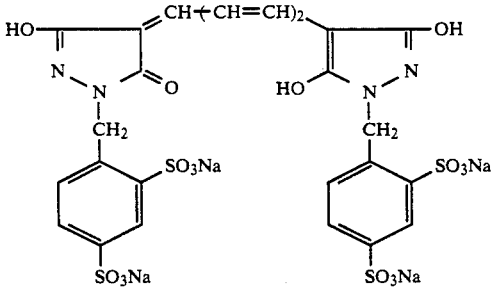
III-25
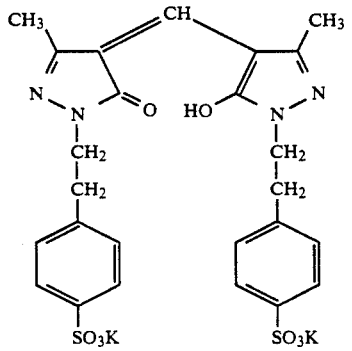

-continued
III-26
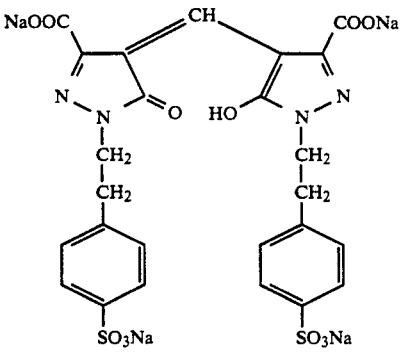
III-27
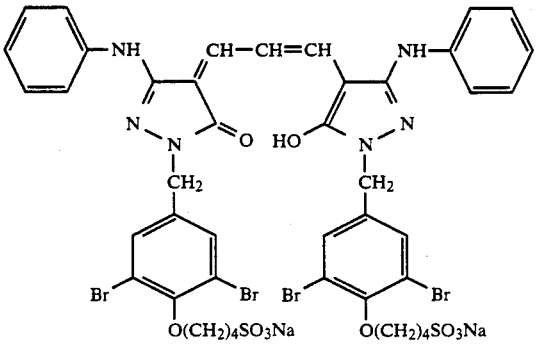
III-28
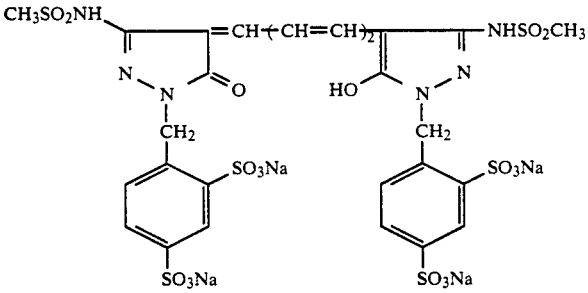
III-29
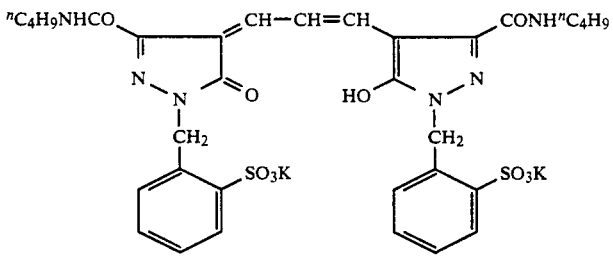
III-30
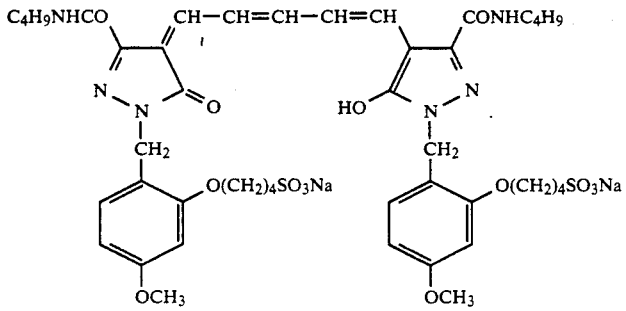

-continued
III-31
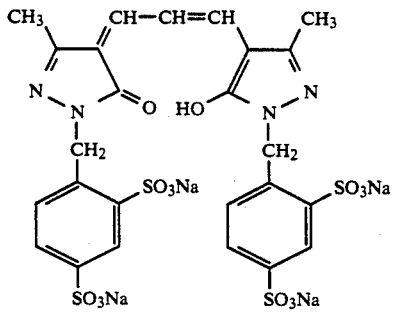
III-32
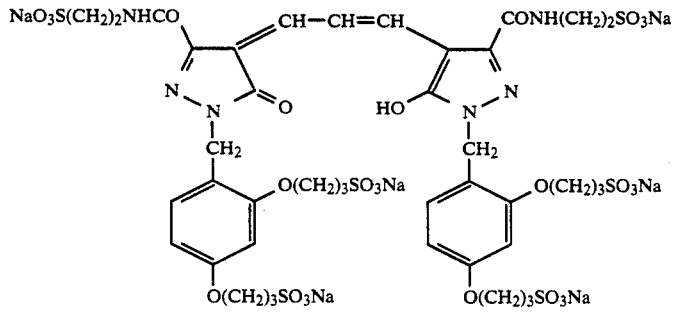
III-33
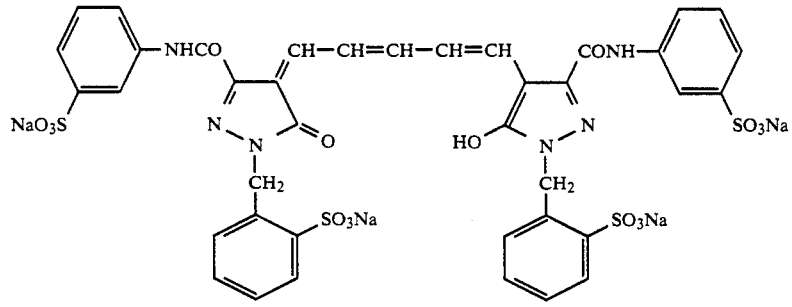
III-34
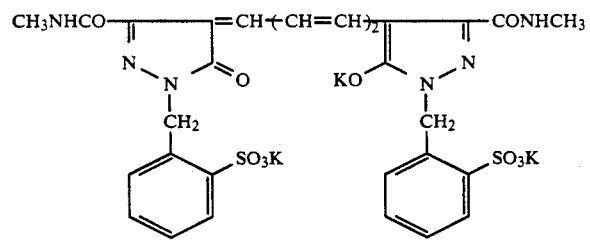
III-35
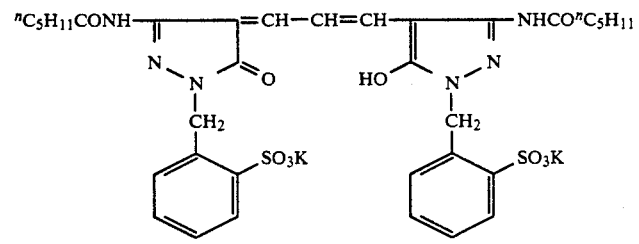

-continued
III-36
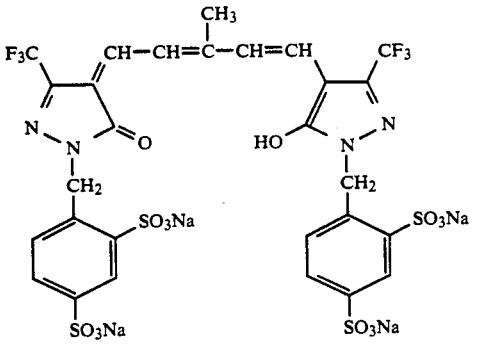
III-37
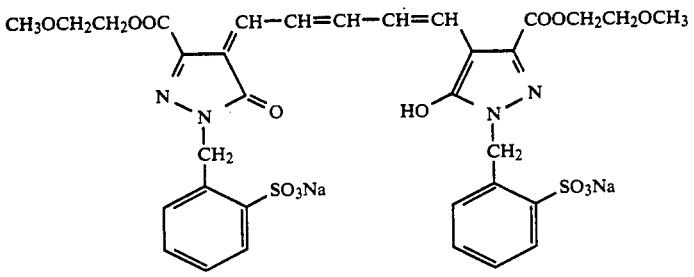
III-38
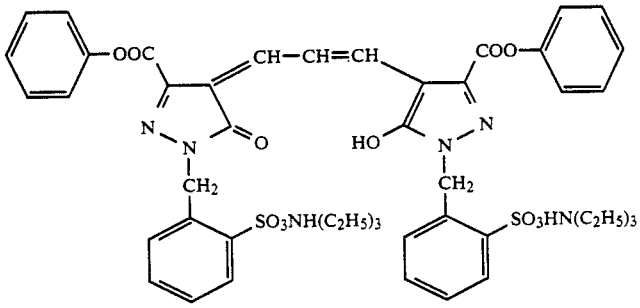
III-39
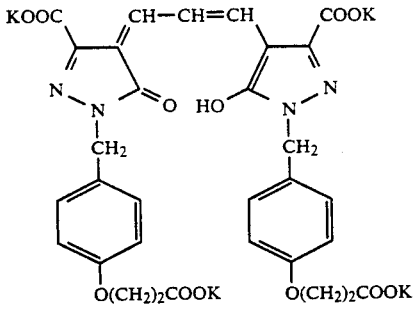
III-40
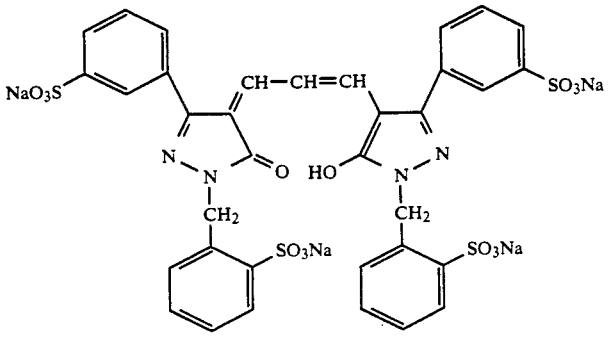

-continued
III-41
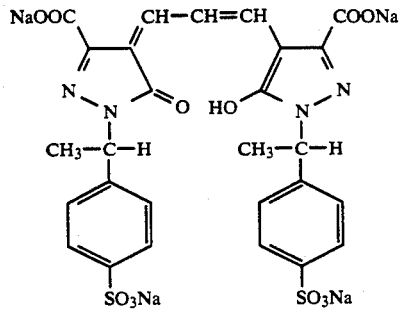
III-42
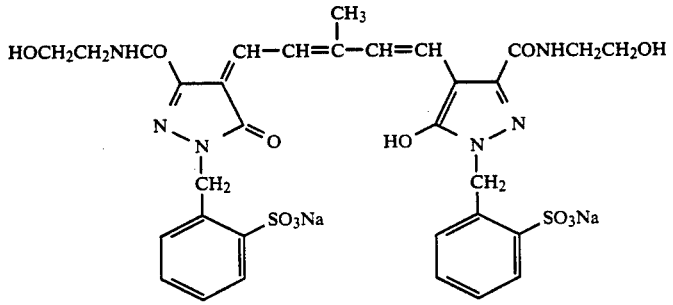
III-43
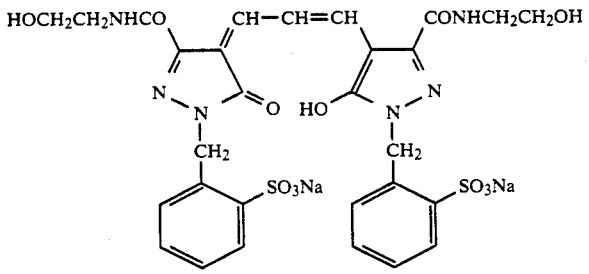
III-44
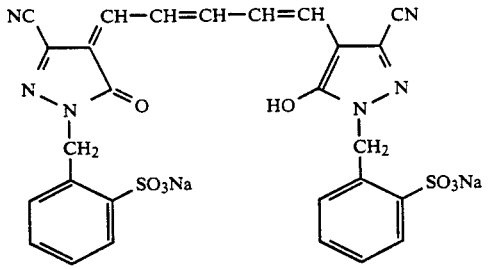
III-45
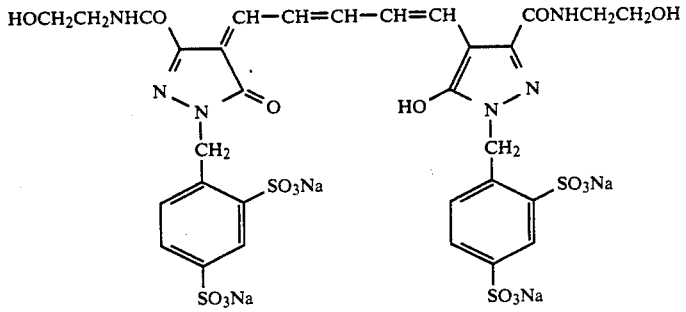

-continued
III-46
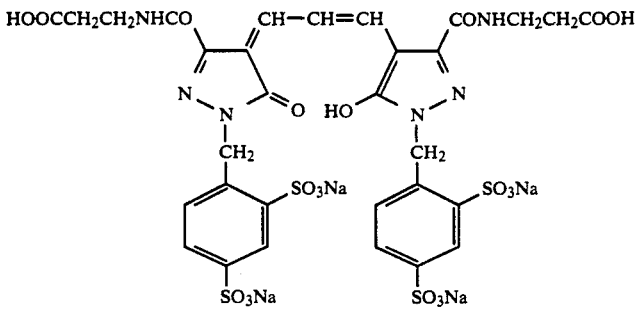
III-47
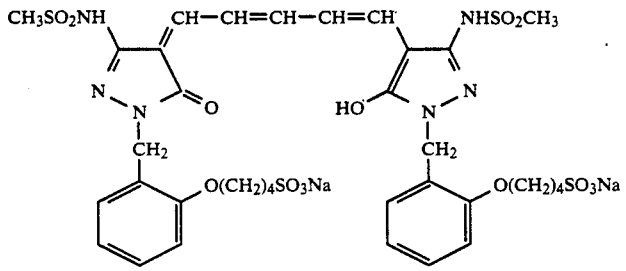
III-48
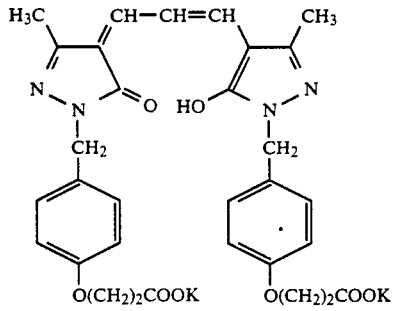
III-49
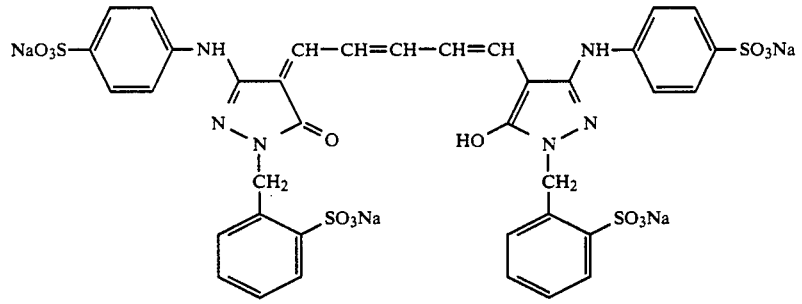
III-50
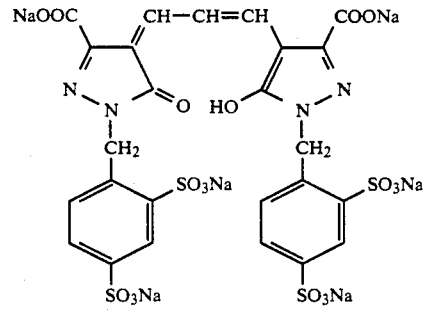

-continued
III-51
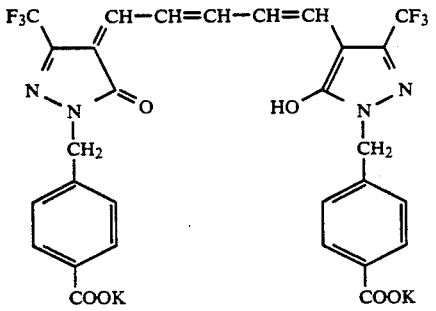
III-52
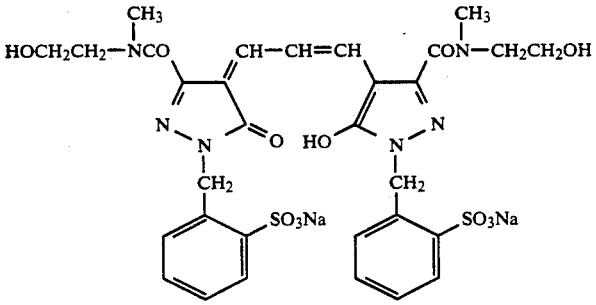
III-53
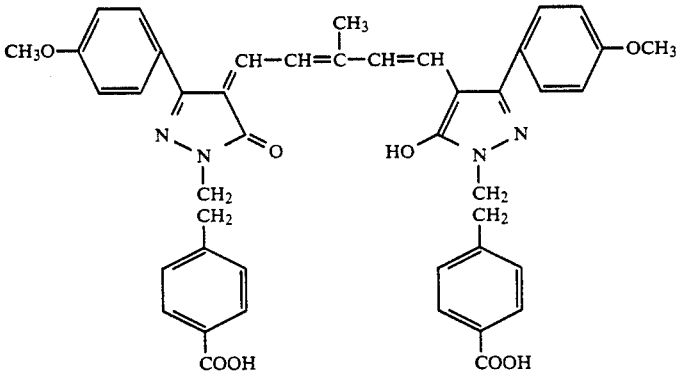
III-54
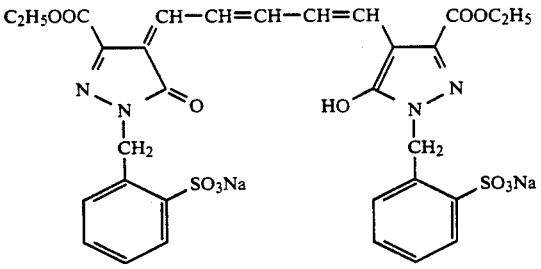
III-55
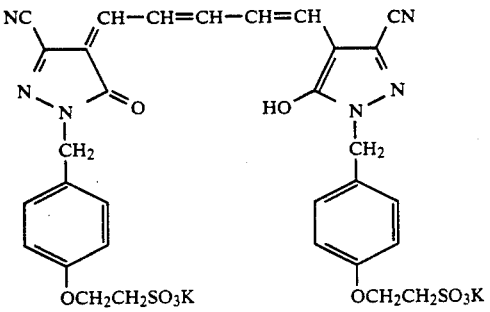

-continued

III-56

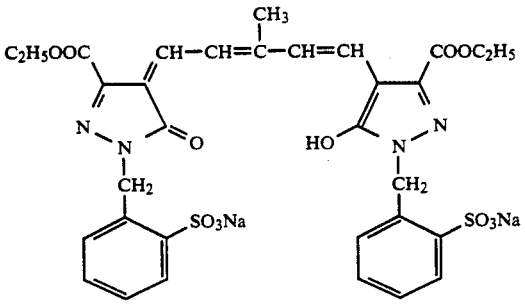

III-57

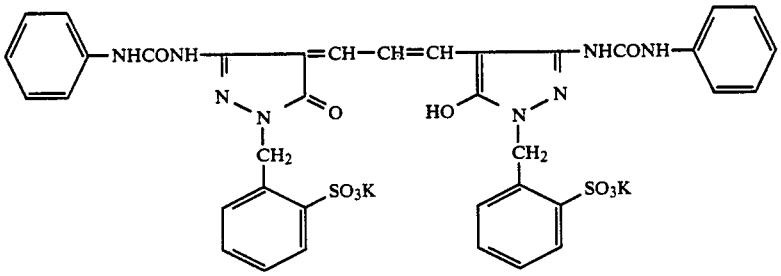

III-58

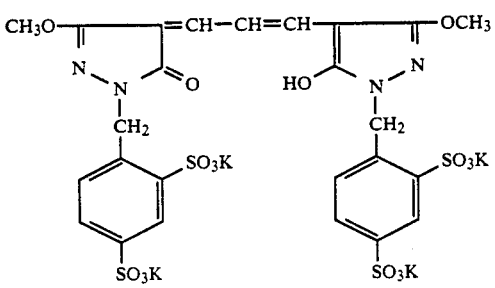

III-59

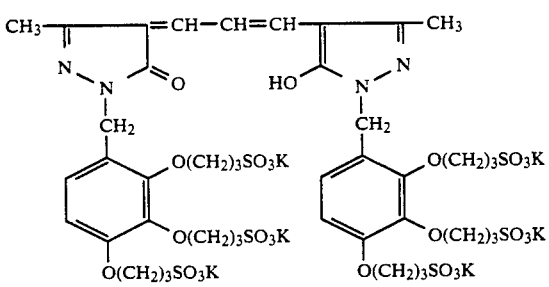

III-60

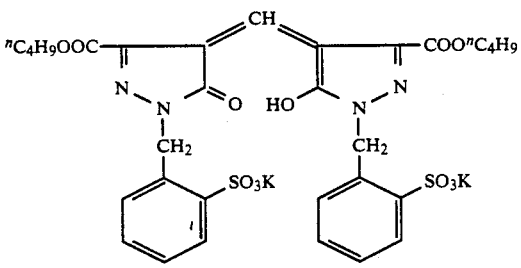

The dyes of formula (III) can be synthesized by the processes disclosed in JP-A-50-145125, 50-147712, 59-111640, 62-273527, 63-244024, and 63-264745 or processes similar thereto The dyes of formula (III) can be incorporated into a coating composition for a silver halide emulsion layer or a light-insensitive hydrophilic colloidal layer in the form of a solution in an appropriate solvent, such as water, an alcohol (e.g., methanol, ethanol, propanol), acetone, methyl cellosolve, or a mixture thereof.

The dyes of the invention may be used either individually or in combination of two or more thereof.

The dye of the invention is usually added in an amount of from $10^{-2}$ to 2 g/m$^2$ and preferably from $10^{-2}$ to 1 g/m$^2$.

If desired, the dye of formula (III) according to the present invention can be used in combination with other known dyes. Known dyes which are preferred for use in combination are described in JP-A-59-154439, 59-208548, 59-211034, and 69-64346, as exemplified by the following compounds.

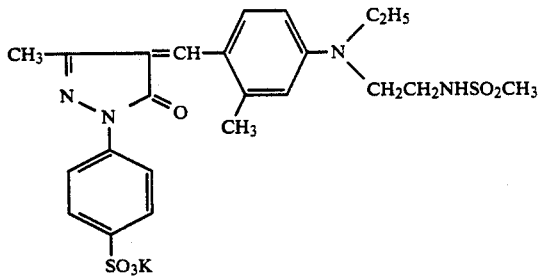

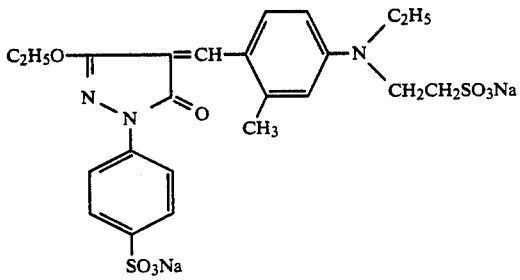

Silver halide to be used in the photographic emulsion layer may be any of silver bromide, silver iodobromide, silver iodochlorobromide, silver chlorobromide, and silver chloride. Preferred silver halides are silver iodobromide containing not more than 15 mole %, particularly from 0.5 to 5 mol %, of silver iodide and silver chlorobromide containing not less than 20 mol % of silver bromide.

A mean grain size of silver halide grains is not particularly limited, but is preferably no greater than 3 μm and more preferably between 0.2 μm and 2 μm.

The silver halide grains may have any crystal form, such as a cubic form, an octahedral form, a tetradechaderal form, a tabular form, a spherical form, and a composite form thereof. Preferred crystal forms are cubic, tetradecahedral, and tubular forms.

The emulsion may be either a polydispersion or a monodispersion. A monodisperse emulsion having a coefficient of size distribution of 20% or less and particularly 15% or less is preferred. The term "coefficient of size distribution (%)" as used herein means a value calculated from formula:

$$\frac{\text{Standard Deviation of Grain Size}}{\text{Mean Value of Grain Size}} \times 100$$

The photographic emulsion which can be used in this invention can be prepared by processes described, e.g., in P. Glafkides, *Chimie et Physique Photographique,* Paul Montel (1967), G. F. Duffin, *Photogrpahic Emulsion Chemistry,* The Focal Press (1966), the V. L. Zelikman et al., *Making and Coating Photographic Emulsion,* The Focal Press (1964). In some detail, the photographic emulsion can be prepared by any of the acid process, neutral process, ammonia process, and the like. The reaction between a soluble silver salt and a soluble halogen salt can be carried out by any of the single jet process, double jet process, a combination thereof, and the like. A so-called reverse mixing process, in which silver halide grains are formed in the presence of excess silver ions, can be used. A controlled double jet process, in which a pAg value of a liquid phase where silver halide grains are formed is maintained constant, can also be used. According to this technique, a silver halide emulsion having a regular crystal form and a nearly uniform grain size can be obtained.

In order to make the grain size uniform, it is preferable to allow crystals to grow rapidly while controlling the concentration of the grain formation system so as not to exceed the critical degree of saturation, for example, by varying the feeding rate of silver nitrate or an alkali halide in proportion to the rate of grain growth as described in British Patent 1,535,016 and JP-B-48-36890 and 52-16364 or by varying the concentration of the aqueous solution as described in U.S. Pat. No. 4,242,445 and JP-A-55-158124.

In case of tabular grains, it is desirable to use those having a grain size within a specific range and/or a uniform grain thickness as described in JP-B-47-11386 and JP-A-63-11928.

The individual silver halide grains may be homogeneous throughout the crystal structure or may have a so-called core/shell structure in which the surface layer and the inside differ in halogen composition. If in using silver iodobromide, it is particularly preferred to use core/shell grains in which the silver iodide content is higher in the core than in the shell by at least 0.5 mol % and more preferably by at least 2 mol %.

During the formation of silver halide grains or subsequent physical ripening, a cadmium salt, a zinc salt, a lead salt, a thallium salt, an iridium salt or a complex salt thereof, a rhodium salt or a complex salt thereof, an iron salt or a complex salt thereof, etc. may be present in the system.

The silver halide emulsion is usually subjected to chemical sensitization. Chemical sensitization can be carried out by processes described, e.g., in H. Frieser (ed.), *Die Grundlagender Photographischen Prozesse mit Silber-halogeniden,* 675–734, Akademische Verlagsgesellschaft (1968). In more detail, it is effected by sulfur sensitization using active gelatin or a sulfur-containing compound capable of reacting with silver, e.g., thiosulfates, thioureas, mercapto compounds, and rhodanines; reduction sensitization using a reducing substance, e.g., stannous salts, amines, hydrazine derivatives, formamidinesulfinic acid, and silane compounds; noble metal sensitization using a noble metal compound, e.g., gold complex salts as well as complex salts of group VIII metals, e.g., platinum, iridium, and palladium; and combination thereof.

For the purpose of preventing fog during preparation, preservation or photographic processing of the photographic materials or stabilizing photographic performance properties, the photographic material of the invention can contain various compounds known as antifoggants or stabilizers, such as azoles, e.g., benzothiazolium salts, nitroindazoles, chlorobenzimidazoles, bromobenzimidazoles, mercaptothiazoles, mercaptobenzothiazoles, mercaptothiadiazoles, aminotriazoles, benzothiazoles, and nitrobenzotriazoles; mercaptopyrimidines; mercaptotriazines; thioketo compounds, e.g., oxazolinethione; azaindenes, e.g., triazaindenes, tetraazaindenes [especially 4-hydroxy-substituted (1,3,3a,7)-tetraazaindenes], pentaazaindenes; benzenethiosulfonic acid, benzenesulfinic acid, and benzenesulfonic acid amide.

For the purpose of increasing sensitivity or contrast or accelerating development, the photographic emulsion layers may contain, for example, polyalkylene oxides or derivatives thereof (e.g., ethers, esters, and amides), thioether compounds, thiomorpholines, quaternary ammonium salt compounds, urethane derivatives, urea derivatives, imidazole derivatives, and developing agents (e.g., dihydroxybenzenes, 3-pyrazolidones). Inter alia, dihydroxybenzenes (e.g., hydroquinone, 2-methylhydroquinone, catechol) or 3-pyrazolidones (e.g., 1-phenyl-3-pyrazolidone, 1-phenyl-4-methyl-4-hydroxymethyl-3-pyrazolidone) are preferably added usually in an amount of not more than 5 g/m$^2$. More specifically, the dihydroxybenzene is preferably added in an amount of from 0.01 to 1 g/m$^2$, and the 3-pyrazolidone is preferably added in an amount of from 0.01 to 0.2 g/m$^2$.

The photographic emulsion and light-insensitive hydrophilic colloids may contain organic or inorganic hardening agents. Examples of usable hardening agents include active vinyl compounds [e.g., 1,3,5-triacryloylhexahydro-s-triazine, bis(vinylsulfonyl)methyl ether, N,N'-methylenebis[$\beta$-(vinylsulfonyl)propionamide], active halogen compounds (e.g., 2,4-dichloro-6-hydroxy-s-triazine), mucohalogenic acids (e.g., mucochloric acid), N-carbamoylpyridinium salts [e.g., (1-morpholinacarbonyl-3-pyridinio)methanesulfonate], and haloamidinium salts [e.g., 1-(1-chloro-1-pyridinomethylene)pyrrolidinium, 2-naphthalenesulfonate], and combinations thereof. Preferred of these compounds are active vinyl compounds described in JP-A-53-41220, 53-57257, 59-162546, and 60-80846 and active halogen compounds described in U.S. Pat. No. 3,325,287.

The photographic emulsion layers or other hyrophilic colloidal layers of the photographic material may further contain various surface active agents as coating aid or antistatic agent or for improvement of slip properties, improvement of emulsifying dispersibility, prevention of adhesion, improvement of photographic characteristics (e.g., acceleration of development, increase of contract, and increase of sensitivity), and the like.

Examples of the surface active agent to be added include nonionic surface active agents, such as saponin (steroid type, alkylene oxide derivatives (e.g., polyethylene glycol, polyethylene glycol/polypropylene glycol condensation products, polyethyene glycol alkyl ethers or alkylaryl ethers, polyethylene glycol esters, polyethylene glycol sorbitan esters, polyalkylene glycol alkylamines or amides, silicon-polyethylene oxide adducts), glycidol derivatives (e.g., alkenylsuccinic polyglycerides, alkylphenyl polyglycerides), fatty acid esters of polyhydric alcohols, alkyl esters of sugars, etc.; anionic surface active agents containing an acid group (e.g., carboxyl, sulfo, phospho, sulfate, and phosphate groups), such as alkylcarboxylates, alkylsulfonates, alkylbenzenesulfonates, alkylnaphthalenesulfonates, alkylsulfates, alkylphosphates, N-acyl-N-alkyltaurines, sulfosuccinates, sulfoalkylpolyoxyethylene alkylphenyl ethers, polyoxyethylene alkylphosphates, etc.; amphoteric surface active agents, such as amino acids, aminoalkylsulfonic acids, aminoalkylsulfates or phosphates, alkylbetaines, amine oxides, etc.; and cationic surface active agents, such as alkylamine salts, aliphatic or aromatic quaternary ammonium salts, heterocyclic quanternary ammonium salts (e.g., pyridinium, imidazolium), aliphatic or heterocyclic phosphonium or sulfonium salts, etc. In particular, fluorine-containing compounds as described in JP-A-60-80849 are preferred as antistatic agent.

For prevention of blocking, a matting agent such as silica, magnesium oxide, and polymethyl methacrylate can be incorporated into the photographic emulsion layer or other hydrophilic colloidal layer.

For improvement of dimensional stability, a dispersion of a water-insoluble or sparingly water-soluble synthetic polymer can be added to the photographic emulsion layers or other hydrophilic colloidal layers. Such a polymer includes homo- or copolymers of alkyl (meth)acrylates, alkoxyacryl (meth)acrylates, and glycidyl (meth)acrylate, and copolymers comprising these monomers and acrylic acid, methacrylic acid, etc.

Binders or protective colloids which can be used in photographic emulsions include gelatin to advantage. Other hydrophilic colloids may also be employed. Examples of the hydrophilic colloids are proteins, such as gelatin derivatives, graft polymers of gelatin and other high polymers, albumin, and casein; cellulose derivatives, e.g., hydroxyethyl cellulose, carboxymethyl cellulose, and cellulose sulfate; sugar derivatives, e.g., sodium dextran, and starch derivatives; and a variety of synthetic hydrophilic polymers, such as polyvinyl alcohol, polyvinyl alcohol partial acetal, poly-N-vinylpyrrolidone, polyacrylic acid, polymethacrylic acid, polyacrylamide, polyvinylimidazole, polyvinylpyrazole, etc., as well as copolymers comprising the monomers constituting these homopolymers.

Gelatin to be used includes lime-processed gelatin, acid-processed gelatin, as well as hydrolysis products or enzymatic decomposition products of gelatin.

The silver halide emulsion layer may further contain a polymer latex, e.g., alkyl acrylates.

The support to be used in the photographic materials of the present invention includes films of cellulose triacetate, cellulose diacetate, nitrocellulose, polystyrene or polyethylene terephthalate, baryta paper, polyolefin-coated paper, and so on.

Photographic processing of the photographic materials of the invention can be carried out according to any known techniques using any known processing solutions. The processing temperature is usually selected from a range of from 18° to 50° C. Temperatures lower or higher than this range may also be employed.

In case of black-and-white photographic processing, the developer to be used contains known developing agents. Examples of usable developing agents are dihydroxybenzenes (e.g., hydroquinone), 3-pyrazolidones (e.g., 1-phenyl-3-pyrazolidone), aminophenols (e.g., N-methyl-p-aminophenol), 1-phenyl-3-pyrazolines, ascorbic acid, and heterocyclic compounds having such a structure in which a 1,2,3,4-tetrahydroquinone ring and an indolene ring are condensed as described in U.S. Pat. No. 4,067,872, either individually or in combination of two or more thereof. In general, the developer additionally contains known additives such as preservatives, alkali agents, pH buffering agents, and antifoggants. If desired, the developer may further contain other additives, such as dissolution aids, toning agents, development accelerators, surface active agents, defoaming agents, water softeners, hardening agents, thickeners, and the like.

For fixation, fixers having known compositions are employable. The fixing agent to be used includes thiosulfates, thiocyanides, as well as organic sulfur compounds know to have fixing effects. The fixer may contain a water-soluble aluminum salt as a hardening agent.

The photographic materials according to the present invention are preferably processed by the use of an automatic developing machine, thereby realizing rapid processing. In this case, it is preferable to conduct development at 30° to 45° C. for 5 to 60 seconds; fixation at 30° to 45° C. for 5 to 30 seconds; and washing at 30° to 45° C. for 5 to 30 seconds. For automatic processing, it is preferable to use an acid hardening fixer containing a polyvalent metal compound.

The present invention is now illustrated in greater detail with reference to the following Examples, but is should be understood that the present invention is not deemed to be limited thereto.

EXAMPLE 1

Preparation of Emulsion

A mixed aqueous solution of potassium iodide and potassium bromide and an aqueous solution of silver nitrate were simultaneously added to a gelatin aqueous solution containing 1,8-dihydroxy-3,6-dithiaoctane at 75° C. for 15 minutes while vigorously stirring and controlling the pAg value at 7.7. There was obtained a monodisperse emulsion of cubic silver iodobromide having a silver iodide content of 6 mol % and a mean grain size of 0.28 μm. Then, a potassium bromide aqueous solution containing $K_3IrCl_6$ and $(NH_4)_3RhCl_6$ and a silver nitrate aqueous solution were added to the emulsion in the same precipitation environment as described above while controlling the pAg vaue at 7.4 to finally obtain a monodisperse cubic core/shell silver iodobromide emulsion (average silver iodide content: 1.5 mol %; mean grain size: 0.45 μm) containing $10^{-7}$ mol of $K_3IrCl_6$ and $10^{-7}$ mol of $(NH_4)_3RhCl_6$ each per mol of silver halide. After washing with water and desalting, 3 mg of sodium thiosulfate and 4 mg of chloroauric acid were added to the emulsion each per mol of silver, and the emulsion was heated at 65° C. for 70 minutes to perform chemical sensitization. Then, 30 mg of a 1% (by weight) aqueous solution of 4-hydroxy-6-methyl-1,3,3a,7-tetraazaindene was added thereto as a stabilizer.

To the resulting emulsion were added, as sensitizing dyes, 20 mg of 3-ethyl-2-(3-ethyl-benzothiazolinylidene-methylidene)-5-(3-ethyl-4-methyl-thiazolinylidene-ethylidene)-rhodanine iodide and 20 mg of disodium 4,4'-bis(dinaphthoxypyrimidylamino)stilbene-2,2'-disulfonate each per mol of silver halide. To the emulsion were further added 50 mg/mol of silver of 1-phenyl-5-mercaptotetrazole as an antifoggant, a polyethyl acrylate latex as a plasticizer at a ratio of 25% by weight based on the gelatin binder, and 120 mg/m$^2$ of 2-bis(-vinylsulfonylacetamido)ethane as a hardening agent.

The resulting coating composition was coated on a polyester support to a silver coverage of 4.5 g/m$^2$ (gelatin coverage: 4.7 g/m$^2$).

On the emulsion layer was simultaneously coated a protective layer comprising 1.5 g/m$^2$ of gelatin, 60 mg/m$^2$ of polymethyl methacrylate particles having a particle size of 3 to 4 μm as a matting agent, 500 mg/m$^2$ of dextran, 150 mg/m$^2$ of hydroquinone as an antifoggant, sodium dodecylbenzenesulfonate as a coating aid, and a fluorine-containing surface active agent of formula:

$$C_8F_{17}SO_2\underset{\underset{C_3H_7}{|}}{N}CH_2COOK$$

The thus prepared sample was designated as Sample 101 (control).

Samples 102 to 107 were prepared in the same manner as for Sample 101, except that the emulsion further contained each of dyes shown in Table 1 below in an amount shown.

Each of Samples 101 to 107 was wedgewise exposed to light of an He-Ne laser having an emission maximum at 633 nm and subjected to development (35° C., 30 seconds), fixation, washing and dryi g by means of an automatic processor "FG-360F" (manufactured by Fuji Photo Film Co., Ltd.) using a developer having the following formulation and, as a fixer, "LF-308" (produced by Fuji Photo Film Co., Ltd.).

| Formulation of Developer: | |
|---|---|
| Water | 720 ml |
| Disodium ethylenediaminetetraacetate | 4 g |
| Sodium hydroxide | 44 g |
| Sodium sulfite | 45 g |
| Sodium carbonate | 26.4 g |
| Boric acid | 1.6 g |
| Potassium bromide | 1 g |
| Hydroquinone | 36 g |
| Diethylene glycol | 39 g |
| 5-Methylbenzotriazole | 0.2 g |
| Pyrazone | 0.7 g |
| Water to make | 1 l |

The processed sample was evaluated for sensitivity, safety from safelight, and color remaining according to the following methods, and the results obtained are shown in Table 1.

1) Sensitivity

A reciprocal of an exposure amount providing a density of 1.5 was taken as sensitivity and expressed relatively.

2) Safety from Safelight

The sample was allowed to stand for 3 minutes under a green safelight of a 20 W bulb ("Fuji Safelight Filter No. 4" produced by Fuji Photo Film Co., Ltd.) placed 1 m above and then developed. An increase of fog density due to the exposure to safelight was measured.

3) Color Remaining

The tint of the unexposed area of the processed sample was visually observed and rated on 5 scales; grade "5" was the best, and grade "1" was the worst.

TABLE 1

| Sample No. | Dye Kind | Dye Amount (mg/m$^2$) | Relative Sensitivity | Safety from Safe-lgiht | Color Remaining | Remark |
|---|---|---|---|---|---|---|
| 101 | — | — | 100 | 1.30 | 5 | Control |
| 102 | III-4 | 180 | 100 | 0.07 | 5 | Invention |
| 103 | " | 360 | 98 | 0.05 | 4 | Invention |
| 104 | III-7 | " | 100 | 0.05 | 4 | Invention |
| 105 | (a)* | " | 98 | 0.05 | 1 | Comparison |
| 106 | (b)** | " | 100 | 0.20 | 5 | Comparison |
| 107 | " | 500 | 95 | 0.06 | 2 | Com- |

TABLE 1-continued

| Sample No. | Dye Kind | Dye Amount (mg/m²) | Relative Sensitivity | Safety from Safe-lgiht | Color Remain-ing | Re-mark |
|---|---|---|---|---|---|---|
| | | | | | | parison |

Note:
Comparative Compound (a)*:

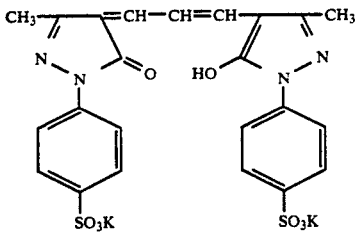

Comparative Compound (b)**:

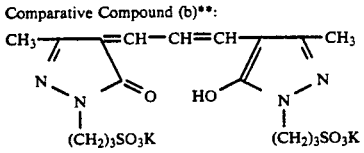

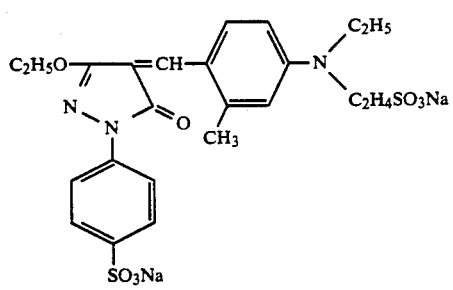

(A)

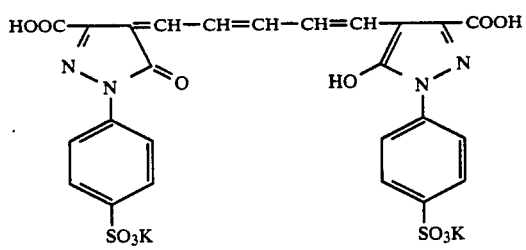

(B)

Each of the samples were exposed to light and subjected to development processing in the same manner as in Example 1, and the processed sample was evaluated in the same manner as in Example 1. The results of evaluations are shown in Table 2.

TABLE 2

| Sample No. | Dye Kind | Dye Amount (mg/m²) | Relative Sensitivity | Safety from Safelight | Color Remaining | Remark |
|---|---|---|---|---|---|---|
| 201 | — | — | 100 | 1.20 | 5 | Control |
| 202 | III-4 | 10 | 100 | 0.06 | 5 | Invention |
| 203 | " | 20 | 98 | 0.04 | 4 | " |
| 204 | III-77 | " | 100 | 0.04 | 4 | " |
| 205 | (a) | " | 98 | 0.05 | 1 | Comparison |
| 206 | (b) | " | 100 | 0.15 | 5 | " |
| 207 | " | 28 | 95 | 0.06 | 2 | " |

It can be seen from Table 1 that Samples 102 to 104 according to the present invention exhibit satisfactory performance properties in any of sensitivity, safety from safelight, and freedom from color remaining.

EXAMPLE 2

Sample Nos. 201 to 207 were prepared in the same manner as described in Example 1, except that the coating composition for the silver halide emulsion layer further contained 20 mg/m² of 2,5-bis(5'-t-butylbenzoxazolyl(2))thiophene as a fluorescent brightening agent, 50 mg/m² of 2,4-dichloro-6-hydroxy-s-triazine as a hardening agent, 20 mg/m² of a dye of following formula (A), and 10 mg/m² of a dye of following formula (B), and the composition was coated on a paper support to a silver coverage of 1.9 g/m². The fluorescent brightening agent was incorporated into the emulsion by dissolving 4 g of the fluorescent brightening agent in ethyl acetate together with 1.0 g of sodium dodecylbenzensulfonate, dispersing the solution in gelatin, and adding the dispersion to the silver halide emulsion in a prescribed amount.

The results of Table 2 prove that the effects of the present invention hold good with the photographic materials using paper as a support.

EXAMPLE 3

Sample 301 was prepared in the same manner as for Sample 101 of Example 1, except that the sensitizing dyes as used in Example 1 were replaced with 50 mg of sodium 3,3'-di(3-sulfopropyl)-5,5'-dichloro-9-ethylthiacarbocyanine and 50 mg of sodium 3,3'-di(3-sulfopropyl)-9-ethyl-naphtho[1,2-d]thiacarbocyanine each per mol of silver halide and that the dextran was not used.

Samples 302 to 307 were prepared in the same manner as for Sample 301, except that the emulsion further contained each of the dyes shown in Table 3 in an amount shown.

Each of Samples 301 to 307 was wedgewise exposed to light of an LED having an emission maximum at 660 nm and then subjected to development processing in the same manner as in Example 1. The processed sample was evaluated in the same manner as in Example 1. The results of evaluations are shown in Table 3.

TABLE 3

| Sample No. | Dye Kind | Dye Amount (mg/m²) | Relative Sensitivity | Safety from Safelgiht | Color Remaining | Remark |
|---|---|---|---|---|---|---|
| 301 | — | — | 100 | 1.15 | 5 | Control |
| 302 | III-4 | 180 | 100 | 0.07 | 5 | Invention |
| 303 | " | 360 | 98 | 0.04 | 4 | " |
| 304 | III-7 | " | 100 | 0.04 | 4 | " |
| 305 | (a) | " | 98 | 0.04 | 1 | Comparison |
| 306 | (b) | " | 100 | 0.18 | 5 | " |
| 307 | " | 500 | 95 | 0.06 | 2 | " |

It can be seen from Table 3 that Samples 302 to 304 according to the present invention exhibit satisfactory performance properties in any of sensitivity, safety from safelight, and freedom from color remaining.

EXAMPLE 4

Sample Nos. 401 to 407 were prepared in the same manner as described in Example 3, except that the coating composition for the silver halide emulsion further contained 20 mg/m² of 2,5-bis(5'-t-butylbenzoxazolyl-(2))thiophene as a fluorescent brightening agent and 50 mg/m² of a hardening agent and that the coating composition was coated on a paper support to a silver coverage of 1.9 g/m². Incorporation of the fluorescent brightening agent into the emulsion was effected by dissolving 4 g of the compound in ethyl acetate together with 1.0 g of sodium dodecylbenzenesulfonate, dispersing the solution in gelatin, and adding the dispersion to the silver halide emulsion in a prescribed amount.

Each of the samples were exposed to light and subjected to development processing in the same manner as in Example 3, and the processed sample was evaluated in the same manner as in Example 1. The results of evaluations are shown in Table 4.

TABLE 4

| Sample No. | Dye Kind | Dye Amount (mg/m²) | Relative Sensitivity | Safety from Safelgiht | Color Remaining | Remark |
|---|---|---|---|---|---|---|
| 401 | — | — | 100 | 1.20 | 5 | Control |
| 402 | III-4 | 90 | 100 | 0.07 | 5 | Invention |
| 403 | " | 180 | 98 | 0.04 | 4 | " |
| 404 | III-7 | " | 100 | 0.04 | 4 | " |
| 405 | (a) | " | 98 | 0.05 | 1 | Comparison |
| 406 | (b) | " | 100 | 0.19 | 5 | " |
| 407 | " | 250 | 95 | 0.06 | 2 | " |

The results of Table 4 prove that the effects of the present invention hold good with the photographic materials using paper as a support.

While the invention has been described indetail and with references to specific embodiments thereof, it will be apparent to one skilled in the art that various changes and modifications can be made therein without departing from the spirit and scope thereof.

What is claimed is:

1. A silver halide photographic material comprising a support having provided thereon a silver halide emulsion layer and another hydrophilic colloidal layer, in which said silver halide emulsion layer contains at least one sensitizing dye selected from the group consisting of a compound represented by formula (I):

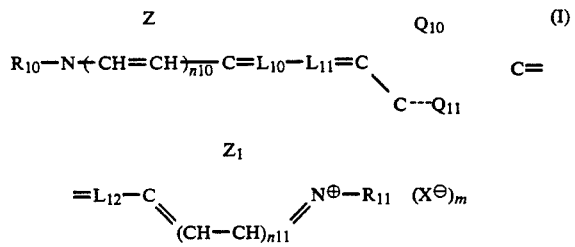

(I)

wherein Z and $Z_1$ each represents a non-metallic atomic group necessary to complete a 5- or 6-membered nitrogen-containing heterocyclic ring; $R_{10}$ and $R_{11}$ each represents a substituted or unsubstituted alkyl group, or an aryl group; $Q_{10}$ and $Q_{11}$ are taken together to represent a non-metallic atomic group necessary to complete a 4-thiazolildinone, 5-thiazolidinone or 4-imidazolidinone nucleus; $L_{10}$, $L_{11}$ and $L_{12}$ each represents a substituted or unsubstituted methine group; or $L_{10}$ and $R_{10}$ or $L_{12}$ and $R_{11}$ are connected via a methine chain to form a nitrogen-containing heterocyclic ring; $n_{10}$ and $n_{11}$ each represents 0 or 1; X represents an anion; m represents 0 or 1; and when m is 0, the compound has a structure of an intramolecular salt, and a compound represented by formula (II):

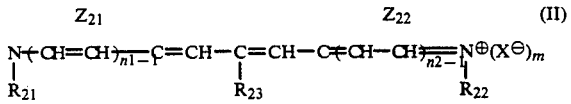

(II)

wherein $Z_{21}$ and $Z_{22}$ each represents a non-metallic atomic group necessary to form a substituted or unsubstituted benzothiazole, benzoselenazole, naphthothiazole, naphthoselenazole or quinoline ring; $R_{21}$ and $R_{22}$ each represents a lower alkyl group, or an alkyl group having a sulfo or carboxyl group; $R_{23}$ represents a lower alkyl group; X represents an anion; n1 and n2 each represents 1 or 2; m represents 1 or 0; and when m is 0, the compound has a structure of an intramolecular salt, said silver halide emulsion layer, said hydrophilic colloidal layer; or bath contains a dye represented by Formula (III):

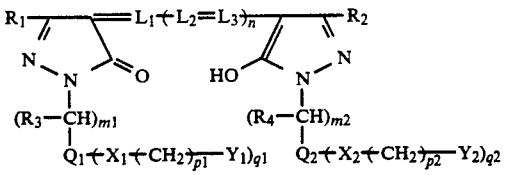

(III)

wherein $R_1$ and $R_2$ each represents a substituted or unsubstituted alkyl group, a substituted or unsubstituted aryl group, a cyano group, $—COOR_5$, $—CONR_5R_6$, $—COR_7$, $—SO2R_7$, $—SOR_7$, $—SO_2NR_5R_6$, $—OR_5$, $—NR_5R_6$, $—NR_6COR_7$, $—NR_5CONR_5R_6$, or $—NR_6SO_2R_7$, wherein $R_5$ and $R_6$ each represents a hydrogen atom, a substituted or unsubstituted alkyl group, or a substituted or unsubstituted aryl group; $R_7$ represents an alkyl group or an aryl group; or $R_5$ and $R_6$, or $R_6$ and $R_7$ are taken together to form a 5- or 6-membered ring; $R_3$ and $R_4$ each represents a hydrogen atom or alkyl group; $Q_1$ and $Q_2$ each represents a substituted or unsubstituted aryl group; $X_1$ and $X_2$ each represents a mere bond or a divalent linking group; $Y_1$ and $Y_2$ each represents a sulfo group or a carboxyl group; $L_1$, $L_2$, and $L_3$ each represents a substituted or unsubstituted methine group; n represents 0, 1, or 2; m1 and m2 each represents 1 or 2; p1 and p2 each represents 0, 1, 2, 3, or 4; and q1 and q2 each represents 1, 2, or 3, wherein in formula (III) the alkyl group as represented by $R_1$, $R_2$, $R_5$, $R_6$, and $R_7$ contains up to 8 carbon atoms, the alkyl group as represented by $R_3$ or $R_4$ contains up to 4 carbon atoms, the aryl group as represented by $R_1$, $R_2$, $R_5$, $R_6$, and $R_7$ is a substituted or unsubstituted phenyl group or a substituted or unsubstituted naphthyl group, and the aryl group as represented by $Q_1$ or $Q_2$ is an unsubstituted phenyl group, an unsubstituted naphthyl group, or a phenyl or naphthyl group substituted with a substituent other than sulfo and carboxyl groups.

2. A silver halide photographic material as claimed in claim 1, wherein the nitrogen-containing heterocyclic ring completed by Z or $Z_1$ in formula (I) is a thiazole benzothiazole, naphthothiazole, selenazole, benzoselenazole, naphthoselenazole, oxazole, benzoxazole, naphthoxazole, 2-quinoline, imidazole, benzimidazole, 3,3'-dialkylindolenine, 2-pyridine, or thiazoline ring.

3. A silver halide photographic material as claimed in claim 1, wherein Z, $Z_1$ or both Z and $Z_1$, in formula (I) forms a thiazole, thiazoline, oxazole or benzoxazole ring.

4. A silver halide photographic material as claimed in claim 1, wherein the alkyl group as represented by $R_{10}$ or $R_{11}$ in formula (I) contains 5 or less carbon atoms.

5. A silver halide photographic material as claimed in claim 1, wherein the compound represented by formula (I) is a compound represented by formula (I-A):

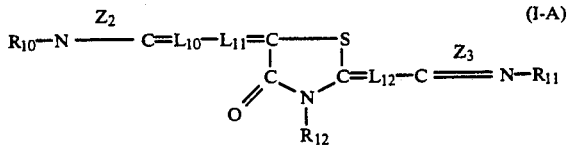

(I-A)

wherein $Z_2$ and $Z_3$, which may be the same or different, each represents a non-metallic atomic group necessary to complete a thiazole, benzothiazole or benzoxazole nucleus; $R_{12}$ represents an alkyl group having from 1 to 6 carbon atoms, an allyl group, or an aralkyl group; and $R_{10}$, $R_{11}$, $L_{10}$, $L_{11}$, and $L_{12}$ are as defined in claim 1.

6. A silver halide photographic material as claimed in claim 1, wherein $R_{23}$ in formula (II) is a methyl, ethyl or propyl group.

7. A silver halide photographic material as claimed in claim 1, wherein said sensitizing dye or dyes represented by formulae (I) and (II) is or are present in an amount of from 5 mg to 500 mg per mol of silver halide.

8. A silver halide photographic material as claimed in claim 1, wherein the divalent linking group as represented by $X_1$ or $X_2$ in formula (III) is —O—, $—NR_8$, $—NR_8CO—$, $—SO_2—$, or $—NR_8SO_2—$, wherein $R_8$ represents a hydrogen atom, an alkyl group having up to 5 carbon atoms or an alkyl group having up to 5 carbon atoms substituted with an alkoxy group having up to 3 carbon atoms, a sulfo group, a carboxyl group, a cyano group, a hydroxyl group, an amino group, a carbamoyl group, or a sulfamoyl group.

9. A silver halide photographic material as claimed as claimed in claim 1, wherein the 5- or 6-membered ring formed by a combination of $R_5$ and $R_6$ or a combination of $R_6$ and $R_7$ in formula (III) is a piperidine, morpholine, pyrrolidine, or pyrrolidone ring.

10. A silver halide photographic material as claimed from claim 1, wherein the sulfo group or carboxyl group of $Y_1$ and $Y_2$ in Formula III is in the form of a salt.

11. A silver halide photographic material as claimed in claim 1, wherein said dye represented by formula (III) is present in an amount of from $10^{-2}$ to 2 g/m$^2$.

12. A silver halide photographic material as claimed in claim 1, wherein said dye represented by formula (III) is present in an amount of from $10^{-2}$ to 1 g/m$^2$.

13. A silver halide photographic material as claimed in claim 1, wherein said dye represented by formula (III) is a compound wherein $R_3$ and $R_4$ each represents a hydrogen atom or a methyl group; $Q_1$ and $Q_2$ each represents a phenyl group or a phenyl group substituted with an alkyl group having up to 4 carbon atoms, an alkoxy group up to 4 carbon atoms, a halogen atom, a dialkylamino group having up to 6 carbon atoms, or a hydroxyl group; and $X_1$ and $X_2$ each represents a mere bond, —O—, or $—NR_8—$, wherein $R_8$ represents a hydrogen atom, an alkyl group having up to 5 carbon atoms or an alkyl group having up to 5 carbon atoms substituted with an alkoxy group having up to 3 carbon atoms, a sulfo group, a carboxyl group, a cyano group, a hydroxyl group, an amino group, a carbamoyl group, or a sulfamoyl group.

14. A silver halide photographic material as claimed in claim 13, wherein m1 and m2 both represent 1.

15. A silver halide photographic material as claimed in claim 14, wherein $R_1$ and $R_2$ each represents an alkyl group, an aryl group, a cyano group, $—COOR_5$, $—CONR_5R_6$, $—COR_7$, $—SO_2R_7$, $—SO_2NR_5R_6$, or $—NR_6SO_2R_7$, wherein $R_5$, $R_6$, and $R_7$ are as defined in claim 1.

* * * * *